United States Patent
Urbano et al.

(10) Patent No.: US 9,116,226 B2
(45) Date of Patent: Aug. 25, 2015

(54) ULTRASOUND IMAGE PERFORMANCE DETERMINATION

(75) Inventors: Joseph A. Urbano, Audubon, PA (US); Kevin S. Randall, Ambler, PA (US); Anthony P. Lannutti, Norristown, PA (US); Michael G. Cannon, Haverford, PA (US); George C. Ku, Norristown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 259 days.

(21) Appl. No.: 13/269,209

(22) Filed: Oct. 7, 2011

(65) Prior Publication Data

US 2012/0141002 A1 Jun. 7, 2012

Related U.S. Application Data

(60) Provisional application No. 61/390,727, filed on Oct. 7, 2010.

(51) Int. Cl.
*G06K 9/00* (2006.01)
*G01S 7/52* (2006.01)
*G01S 7/00* (2006.01)

(52) U.S. Cl.
CPC ........... *G01S 7/5205* (2013.01); *G01S 7/52073* (2013.01); *G01S 7/003* (2013.01)

(58) Field of Classification Search
None
See application file for complete search history.

(56) References Cited

U.S. PATENT DOCUMENTS

| | | | | |
|---|---|---|---|---|
| 5,905,692 | A * | 5/1999 | Dolazza et al. | 367/123 |
| 6,113,547 | A * | 9/2000 | Catallo et al. | 600/459 |
| 6,117,085 | A * | 9/2000 | Picatti et al. | |
| 6,142,946 | A * | 11/2000 | Hwang et al. | 600/459 |
| 6,375,617 | B1 * | 4/2002 | Fraser | 600/443 |
| 6,440,072 | B1 * | 8/2002 | Schuman et al. | 600/437 |
| 6,469,639 | B2 * | 10/2002 | Tanenhaus et al. | 340/870.16 |
| 6,695,778 | B2 * | 2/2004 | Golland et al. | 600/437 |
| 6,780,154 | B2 * | 8/2004 | Hunt et al. | 600/446 |
| 7,022,075 | B2 * | 4/2006 | Grunwald et al. | 600/446 |
| 7,914,442 | B1 * | 3/2011 | Gazdzinski | 600/109 |
| 8,694,306 | B1 * | 4/2014 | Short et al. | 704/200 |
| 2003/0139664 | A1 * | 7/2003 | Hunt et al. | 600/407 |
| 2004/0127790 | A1 * | 7/2004 | Lang et al. | 600/438 |
| 2004/0181154 | A1 * | 9/2004 | Peterson et al. | 600/459 |
| 2008/0110266 | A1 * | 5/2008 | Randall et al. | 73/661 |
| 2008/0114247 | A1 * | 5/2008 | Urbano et al. | 600/447 |
| 2009/0105597 | A1 * | 4/2009 | Abraham | 600/466 |
| 2010/0174194 | A1 * | 7/2010 | Chiang et al. | 600/447 |
| 2010/0262005 | A1 * | 10/2010 | Karasawa | 600/443 |
| 2011/0245676 | A1 * | 10/2011 | Lin et al. | 600/447 |

* cited by examiner

*Primary Examiner* — Nancy Bitar

(57) ABSTRACT

Embodiments contemplate methods and systems for determining an image performance measurement in an ultrasound system. Embodiments contemplate that data may be received from a remote unit of an ultrasound imaging system. One or more determinations of the measure of performance of an image may be made, where the image may be derivable from at least part of the data. The measure of image performance may be displayed on a main unit of the ultrasound imaging system.

24 Claims, 15 Drawing Sheets

| ANL 0.0 dB | ANL 0.5 dB | ANL 1.3 dB | ANL 2.9 dB | No Signal |
|---|---|---|---|---|

WSQ level indicated by the bar graphs

| | |
|---|---|
| ANL < 0.1 dB<br>4 to 6 Bars | At this condition, very reliable wireless probe performance without noise being introduced because of wireless link quality may be expected. |
| ANL 0.1 dB to 1.0 dB<br>3 Bars | At this condition, there is a possibility of noise being introduced to the image because of a compromised wireless probe link. Mitigation may be accomplished with the probe being within 3 meters of the main unit, in a line-of-sight, without obstructions between the probe and the main unit. |
| ANL > 1.0 dB<br>2 or 1 Bars | At this condition, there is an increased possibility of noise being introduced to the image because of a compromised wireless probe link. Mitigation may be accomplished with the probe being within 3 meters of the main unit, in a line-of-sight, without obstructions between the probe and the main unit. |
| 0 Bars | The wireless signal quality is below a usable level, so the image screen may be blanked. A message may appear on the screen informing of this condition. Mitigation may be accomplished with Reorientation of the probe/main unit to within 3 meters of each other, in a line-of-sight, without obstructions between the probe and the main unit. |

FIGURE 7

| Transducer | Wireless Signal Quality Meter (WSQ) Bars | Scanning Depth (cm) | Average Noise Level (ANL) dB | Image (noise streaks in vessel) |
|---|---|---|---|---|
| C5-2 (3.5MHz Curvilinear) | 2 | 8 | 0.69 | |
| C5-2 (3.5MHz Curvilinear) | 2 | 16 | 0.92 | |
| C5-2 (3.5MHz Curvilinear) | 2 | 18 | 1.40 | |

FIGURE 8

| Transducer | Wireless Signal Quality Meter (WSQ) Bars | Scanning Depth (cm) | Average Noise Level (ANL) dB | Image (noise streaks in vessel) |
|---|---|---|---|---|
| L8-3 (6.5 MHz Linear) | 2 | 3 | 0.53 | |
| L12-5 (10 MHz Linear) | 2 | 4 | 0.94 | |
| C5-2 (3.5 MHz Curvilinear) | 2 | 16 | 1.28 | |

FIGURE 9

ULTRASOUND IMAGE PERFORMANCE DETERMINATION

CROSS REFERENCE TO RELATED APPLICATIONS

This application claims the benefit of U.S. Provisional Patent Application No. 61/390,727, filed on Oct. 7, 2010, and titled "Ultrasound Image Performance Determination", the entire contents thereof being incorporated by reference herein, for all purposes.

BACKGROUND

In ultrasound systems, the ultrasound image that is displayed, typically on a main unit or base unit, represents an interpretation of ultrasound data gathered by an ultrasound probe. The ultrasound probe may transmit ultrasound waves into a medium and receive ultrasound waves echoed from elements of the medium. The echoed waves received by the ultrasound probe may be converted to digital or analog electrical signals, or data, that correspond to the received echoed ultrasound waves. The electrical signals (or data) may be processed, either in the ultrasound probe or in the main unit, or both, in order to produce the visual image used by the ultrasound technician to conduct the ultrasound examination, for analysis, and to draw conclusions. The signal processing may include data reduction, compression, mapping, filtering, and beamforming, among other kinds of signal or data processing. In some ultrasound systems, the data may be largely unprocessed or not processed at all.

As the echoed ultrasound waves may be received at the ultrasound probe and processed in the ultrasound probe, the signals or data that represent the received echoed ultrasound waves may be transmitted to the main unit. At the main unit, the data may be processed and/or further processed to form the visual image. The transmission of the data may occur via a wired connection between the ultrasound probe and the main unit or via a wireless connection between the ultrasound probe and the main unit. The data may develop errors during the transmission of the data between the ultrasound probe and the main unit. Errors in the data transmitted between the ultrasound probe and the main unit may have an impact on the visual image that is based on the transmitted data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Embodiments contemplate that an ultrasound imaging system with a wired or a wireless ultrasound probe may experience reduced imaging performance, perhaps as a result of poor transmission signal quality. Embodiments contemplate systems and methods that may indicate the extent of the imaging performance degradation in a quantifiable manner.

Embodiments contemplate a wireless communication system, in which the data transferred from the ultrasound probe to a Main Unit via a high-speed wireless link may be prone to bit errors due to potentially poor wireless signal quality, among other causes. The wireless interface may be designed to provide robust operation over a typical operating range and environment. The wireless link quality may degrade if the range exceeds approximately 3 meters, or the like, or if obstructions exist in the signal path. The receive antennas on the Main Unit may be designed with some directionality, so the signal may drop off if the probe is located outside of a direct line-of-sight. It may be useful to inform the ultrasound system user of the potential for image quality degradation due to poor wireless signal quality.

Embodiments contemplate that at least three measures may be used to gauge signal quality: wireless signal-to-noise ratio, average number of synchronization code bit errors, and/or average number of parity bit errors. These signal quality measures may correlate to a percentage of bit errors in the received data and in a level of image quality. An indication for wireless signal quality may be derived. The indication may have a value from 0 to 6 that may be presented as a bar graph (termed the wireless signal quality (WSQ) meter, for example) on one or more system displays. An imaging performance under various WSQ conditions may be determined, whereby the WSQ meter may be recorded along with the imaging performance-related parameter that may be referred to as an Average Noise Level (ANL).

Embodiments contemplate methods and systems for determining image quality in an ultrasound system. Data may be received from an ultrasound probe. A determination of a measure of performance of an image may be made, where the image may be convertible from at least part of the data. The measure of image performance may be displayed.

Embodiments contemplate one or more device and techniques to determine an image quality. Embodiments contemplate receiving a first data at a main unit of an ultrasound system. Embodiments may further include determining a measure of performance of an image. Embodiments contemplate that the image may be derivable or convertible from at least a part of the first data. The measure of performance may be displayed. Embodiments contemplate that the first data may be received via at least one of a wireless communication link or a wired connection. Embodiments may further include converting at least part of the first data into the image. Alternatively or additionally, embodiments may further include receiving a second data at the main unit. One or more embodiments may include determining the measure of performance based, at least in part, on the second data. Alternatively or additionally, embodiments may further include determining the measure of performance based, at least in part, on a correlation between at least part of the first data and a predetermined condition. Alternatively or additionally, embodiments may further include determining the measure of performance based, at least in part, on a correlation between the image and a predetermined image characteristic. Alternatively or additionally, embodiments may further include determining the measure of performance based, at least in part, on both the correlation between at least part of the first data and a predetermined condition and the second data. Further, embodiments contemplate displaying the image via the main unit of the ultrasound system. One or more embodiments may include displaying the measure of performance via the main unit of the ultrasound system proximate to the displayed image. Alternatively or additionally, embodiments contemplate storing data from which the image may be derivable and the measure of performance in a memory. The stored data from which the image is derivable may be associated with the stored measure of performance.

Embodiments contemplate receiving a first data at a main unit of an ultrasound system. Embodiments may also include identifying at least a part of the first data from which one or more frames of an image may be derivable. Embodiments may also include determining a measure of performance of the image based at least in part on the identified first data. Also, embodiments may include displaying the measure of performance. Alternatively or additionally, embodiments contemplate identifying a second data from at least part of the first data, and identifying a third data from at least part of the first data. Embodiments contemplate that a first frame of the image may be derivable from the second data and that a second frame of the image may be derivable from the third data. Alternatively or additionally, embodiments contemplate that the determining a measure of performance may include determining a measure of variability between the second data and third data. Alternatively or additionally, embodiments contemplate that the determining a measure of performance may include determining a measure of variability among at least one of the second data or the third data.

Embodiments contemplate techniques of determining image quality. One or more embodiments may include receiving a first data at a main unit of an ultrasound system. Embodiments may also include determining a measure of performance of an image. Embodiments contemplate that the image may be derivable from at least a part of the first data. Embodiments may also include comparing the measure of performance to a threshold. Embodiments may also include providing an indication, where the indication may be based, at least in part, on the comparison. Embodiments contemplate that the indication may include at least one of a display of the measure of performance, a display of a difference between the threshold and the measure of performance, a blanking of at least part of a display device, a display of a predetermined message, a display of a predetermined pattern, a display of a predetermined color, at least a partial illumination of a light, an audible presentation of a predetermined message, or an audible presentation of a predetermined sound.

Embodiments contemplate a main unit of an ultrasound system that may comprise a receiver configured, at least in part, to receive a first data. Embodiments contemplate that the main unit may also include a processor configured, at least in part, to determine a measure of performance of an image. Embodiments contemplate that the image may be derivable from at least a part of the first data. Embodiments contemplate that the main unit may include a display configured, at least in part, to indicate the measure of performance. Alternatively or additionally, embodiments contemplate that the main unit may include a memory. Embodiments contemplate that data from which the image may be derivable and the measure of performance may be stored in the memory, where the stored data from which the image is derivable may be associated with the stored measure of performance.

BRIEF DESCRIPTION OF THE DRAWINGS

FIG. 7 illustrates exemplary interpretation and operation guidance for varying image qualities and wireless signal qualities consistent with embodiments;

FIG. 8 illustrates an image, wireless signal quality, and image quality for a representative transducer consistent with embodiments;

FIG. 9 illustrates an image, wireless signal quality, and image quality for representative transducers consistent with embodiments;

DETAILED DESCRIPTION OF ILLUSTRATIVE EMBODIMENTS

Figure 1:
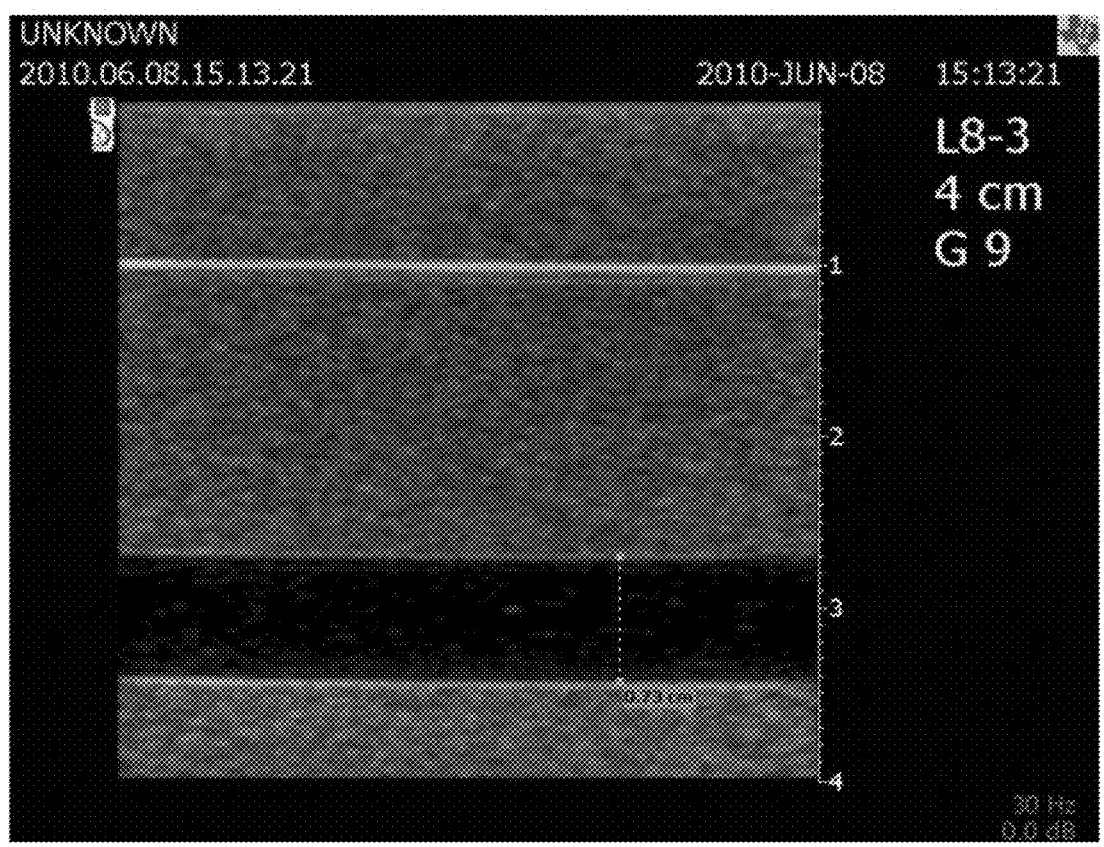
FIG. 1 depicts an exemplary cyst longitudinally imaged to maximize the hypoechoic area.

A detailed description of illustrative embodiments will now be described with reference to FIGS. 1-11. Although this description provides a detailed example of possible embodiments, it should be noted that the details are intended to be exemplary and in no way limit the scope of disclosed embodiments.

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. Also, as used herein, the article "a", unless further qualified or characterized, is contemplated to mean "one or more" or "at least one."

Similarly, with respect to the components shown in the Figures, it should be appreciated that many other components may be included with the scope of the embodiments. The components are selected to facilitate explanation and understanding of the embodiments, and not to limit the embodiments to the components shown.

There are many transducer array systems contemplated by the disclosed embodiments. Most of the description focuses on a description of a diagnostic medical ultrasound system, however the disclosed embodiments are not so limited. The description focuses on diagnostic medical ultrasound systems solely for the purposes of clarity and brevity. It should be appreciated that disclosed embodiments apply to numerous other types of methods and systems.

In a transducer array system, the transducer array is used to convert a signal from one format to another format. For example, with ultrasound imaging the transducer converts an ultrasonic wave into an electrical signal, while a RADAR system converts an electromagnetic wave into an electrical signal. While the disclosed embodiments are described with reference to an ultrasound system, it should be appreciated that the embodiments contemplate application to many other systems. Such systems include, without limitation, RADAR systems, optical systems, audible sound reception systems. For example, in some embodiments, the audible sound reception system may be used at a sporting event to detect on-field sounds with a large microphone and wirelessly transmit the sound back to a main unit.

In addition, although the disclosed embodiments are described with reference to a medical ultrasound system, it should be appreciated that the embodiments contemplate application to many other types of ultrasound system. For example, the disclosed embodiments apply to non-destructive testing systems. Such non-destructive testing systems may be used to inspect metal, wood, plastics, etc. for structural integrity and/or to ascertain certain characteristics of the material. For example, the embodiments may be used to inspect piping for cracks and/or to determine their thickness. Also, non-destructive testing systems may be used to inspect material connections, like metal welds, and the like.

Also, although the disclosed embodiments are described with reference to a diagnostic system, it should be appreciated that the embodiments contemplate application to many other types of systems, including, for example, therapeutic ultrasound systems.

Figure 10:
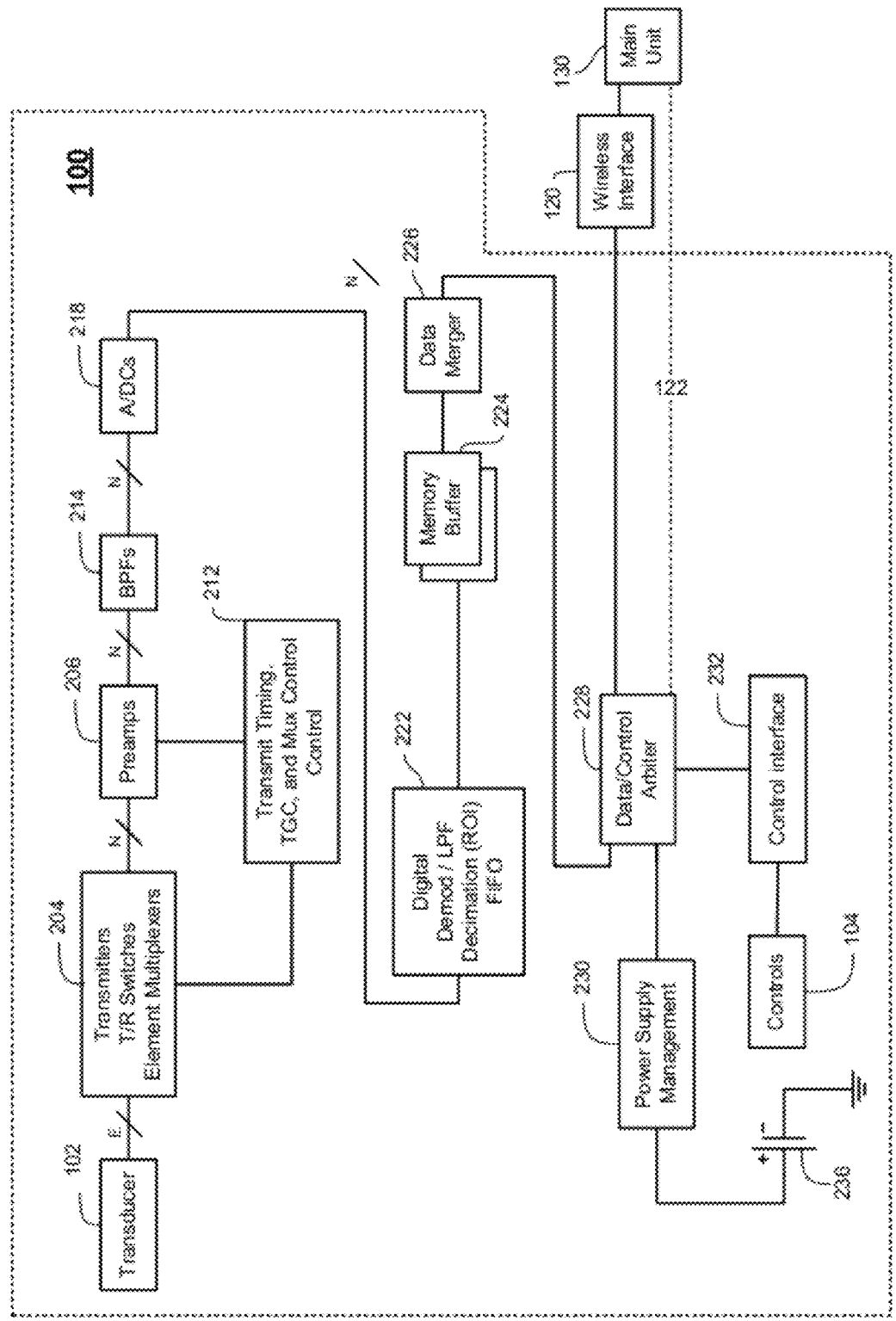
FIG. 10 illustrates a block diagram illustrating various components of an example ultrasound system probe consistent with embodiments.

FIG. 10 is a block diagram illustrating various components of an example probe 100 according to one embodiment. It should be appreciated that any or all of the components illustrated in FIG. 10 may be disposed within a housing (not shown in FIG. 10) having any form factor. Probe 100 may include circuitry that is represented in FIG. 10 as a series of blocks, each having a different function with respect to the operation of probe 100. While the following discussion treats each of the blocks as a separate entity, an embodiment contemplates that any or all of such functions may be implemented by hardware and/or software that may be combined or divided into any number of components. For example, in one embodiment the functions represented by any or all of the blocks illustrated in FIG. 10 may be performed by components of a single printed circuit board or the like.

Transducer 102 represents any number of transducer elements that may be present in probe 100. Electroacoustic ultrasound transducer types include piezoelectric, piezoceramic, capacitive, microfabricated, capacitive microfabricated, piezoelectric microfabricated, and the like. Some embodiments may include transducers for sonar, radar, optical, audible, or the like. Transducer 102 elements may be comprised of individual transmitter and receiver elements. For example, transmitter 204 includes one or more transmitters that drive each of the transducer elements represented by transducer 102, as well as transmit and/or receive switch circuitry that isolates transmitter 204 from a receiver channel (which may be part of preamp 206 in FIG. 10) during the transmit event. The transmitters may produce a focused, unfocused or defocused transmit beam, depending on the intended application. For example, the focused beam may be useful when high peak acoustic pressure is desired as is the case of harmonic imaging. One embodiment uses defocused transmit beams to provide insonfication or interrogation of a relatively larger spatial region as required for synthetic transmit focusing. The transmit beam may be configured to elicit return echo information that is sufficient to produce an ultrasound image along an imaging plane.

Probe 100 receiver circuitry (not shown in FIG. 10) may include a low-noise, high-gain preamplifier 206 for each receive channel (e.g., manufactured by Texas Instruments model number VCA2615 dual-channel variable gain amplifier or the like). Any number of receive channels may be present in an embodiment. Preamplifier 206 may provide variable gain throughout a data acquisition time interval. Preamplifier 206 may be followed by bandpass filter 214 that may operate to reduce the noise bandwidth prior to analog-to-digital (A/D) conversion.

Transmit timing, time-gain control (TGC) and multiplexer control 212 may in some embodiments provide timing and control of each transmit excitation pulse, element multiplexer setting, and TGC waveform. An example unipolar transmitter channel circuit may include, for example, a transistor functioning as a high-voltage switch followed by a capacitor. The capacitor may be charged to a high voltage (e.g., 100V), and then discharged through the transistor upon excitation by a trigger pulse. Similar transistor-based switches may also be used for transmit/receive isolation, element-to-channel multiplexing, etc. Other embodiments may include more sophisticated transmitters capable of bipolar excitations and/or complex wave shaping and/or the like.

To focus the transmitted ultrasound energy at a desired spatial location, in some embodiments, the excitation pulse of each transducer element may be delayed in time relative to the other elements. Such a delay pattern may cause the ultrasound waves from excited elements to combine coherently at a particular point in space, for example. This may be beneficial for a focused and/or an acoustic transmit focused system, for example. Alternatively, the transmit waveforms may be delayed in such a way as to defocus the beam. This may be beneficial for a system employing synthetic transmit focusing, for example.

In some embodiments, a TGC portion of block 212 may provide a programmable analog waveform to adjust the gain of variable gain preamplifier 206. The analog waveform may be controlled by a user through a user interface such as, for example, a set of slide controls used to create a piece-wise linear function. In some embodiments, this piece-wise linear function may be calculated in software, and then programmed into sequential addresses of a digital memory, for example. The digital memory may be read out sequentially at a known time interval beginning shortly after the transmit excitation pulse, for example. In some embodiments, output of the memory may be fed into a digital-to-analog converter (DAC) to generate the analog waveform. In some embodiments, time may be proportional to the depth of the ultrasound echoes in the ultrasound receiver. As a result, echoes emanating from tissue deep within a patient's body may be attenuated more than those from shallow tissue and, therefore, require increased gain. The controlling waveform may also be determined automatically by the system by extracting gain information from the image data, for example. Also, in some embodiments, the controlling waveform may be predetermined and stored in the memory, and/or determined during system operation.

One embodiment may include a multiplexer within block 204 for multiplexing a relatively large array of transducer 102 elements into a smaller number of transmit and/or receive channels. Such multiplexing may allow a smaller ultrasound aperture to slide across a full array on successive transmit events. Both transmit and receive apertures may be reduced to the same number of channels or they may differ from each other. For example, the full array may be used for transmitting while a reduced aperture may be used on receive. It should be appreciated that any combination of full and/or decimated arrays on both transmit and receive are contemplated by the disclosed embodiments.

Multiplexing also may provide for building a synthetic receive aperture by acquiring different subsets of the full aperture on successive transmit events. Multiplexing may also provide for the grouping of elements by connecting adjacent elements on either transmit or receive. Grouping by different factors is also possible such as, for example, using a group of three elements on transmit and a group of two elements on receive. One embodiment may provide multiplexing for synthetic transmit focusing mode and multiplexing for acoustic transmit focusing mode and provide for switching from one mode to the other, for example, on frame boundaries. Other multiplexing schemes are also possible and are contemplated by the disclosed embodiments.

Multiplexing may be controlled by using transmit timing, TGC and multiplexer control 212. Various transmit and/or receive elements may be selected when imaging a particular spatial region. For example, ultrasound echo data for an image frame may be acquired by sequentially interrogating adjacent sub-regions of a patient's body until data for the entire image frame has been acquired. In such a case, different sub-apertures (which may include elements numbering less than the full array) may be used for some or all sub-regions. The multiplexer control function may be programmed to select the appropriate sub-aperture (transmit and/or receive), for example, for each transmit excitation and each image region. The multiplexer control function may also provide control of element grouping.

Analog to Digital (A/D) converter 218 may convert the analog image data received from probe 100 into digital data using any method. Digital demodulator 222 may include any type of digital complex mixer, low-pass filter and re-sampler after each A/D converter channel, for example. In some embodiments, the digital mixer may modulate the received image data to a frequency other than a center frequency of probe 100. It some embodiments, this function may be performed digitally rather than in the analog or sampling domains to provide optimum flexibility and minimal analog circuit complexity. The low-pass filter may reduce the signal bandwidth after mixing and before re-sampling when a lower sampling rate is desired. One embodiment may use quadrature sampling at A/D converter 218 and, therefore, such an embodiment may not require a quadrature mixer to translate the digital data (e.g., radio frequency (RF)) signals of transducer 102 to a baseband frequency. However, complex demodulation by means of an analog or digital mixer or the like may also be used in connection with an embodiment.

Memory buffer 224 may have sufficient storage capacity to store up to, for example, two frames of data. Such a frame-sized buffer 224 may allow frames to be acquired at a rate substantially higher than the rate at which frames can be transferred to main unit 130 (or some other device) across wireless interface 120, for example. Such a configuration may, in an embodiment, be preferable to acquiring each frame over a longer time interval because a longer time interval may reduce a coherence of the acquired data throughout the frame. If frame transmission rates are at least as fast as frame acquisition rates, a smaller memory buffer 224 may be used in some embodiments. One embodiment uses a "ping-pong" buffer fed by the receiver channels as memory buffer 224. Data from multiple channels may be time interleaved into memory buffer 224. For example, 32 receiver channels each sampled at the rate of 6 MHz would produce a total baseband data rate of 192M words per second, which is well within the rates of conventional DDR2 SDRAM. The ping-pong nature of memory buffer 224 may allow new data to fill buffer 224 while previously acquired data is read from memory and sent to wireless interface 120, for example.

Memory buffer 224 is followed by data merger 226. Data merger 226 may operate to merge receive channel data into one or more data streams before advancing the data stream to wireless interface 120 for transmission to main unit 130, for example. Data from data merger 226 may be sent across wireless interface 120 (and/or across wired interface 122) at a rate that is appropriate for the transmission medium. The data from the receive channels may be multiplexed in some fashion prior to transmission over wireless interface 120 and/or wired interface 122. For example, time-division multiplexing (TDM) may be used. Other types of multiplexing are also possible such as, for example, frequency-division multiplexing (FDM), code-division multiplexing (CDM), and/or some combination of these or other multiplexing techniques.

In addition to image data transfer, control information may be transferred between probe 100 and main unit 130. Such control data may be transferred over the same communication link, such as wireless interface 120 and/or wired interface 122, or some other communication link. Control commands may be communicated between main unit 130 and probe 100 (and/or some other devices). Such control commands may serve various purposes, including for example, instructing a mode of operation and/or various imaging parameters such as maximum imaging depth, sampling rate, element multiplexing configuration, etc. Also, control commands may be communicated between probe 100 and main unit 130 to communicate probe-based user controls 104 (e.g., button pushes) and probe operational status (e.g., battery level from power supply management 230), and the like.

The probe's status may include an indicator and/or display of certain values relevant to the operation of the system. For example, the indicator may be visible, audio, and/or some combination thereof. Without limitation, the indicator may indicate power status, designation of device, type of device, frequency range, array configuration, power warnings, capability of a remote unit, quality of transmission of digital data, quantity of errors in transmission of digital data, availability of power required for transmission of digital data, change in transmission rate, completion of transmission, quality of data transmission, look-up tables, programming code for field programmable gate arrays and microcontrollers, transmission characteristics of the non-beamformed ultrasound wave, processing characteristics of the echoed ultrasound wave, processing characteristics of the digital data, and/or transmission characteristics of the digital data, etc. Also, the indicator may show characteristics of a power source like capacity, type, charge state, power state, and age of power source.

In some embodiments, data/control arbiter 228 may be responsible for merging control information and image data communicated between probe 100 and main unit 130. The control information may be passed from control interface 232, where it is collected to data/control arbiter 228 for transmission to main unit 130. In some embodiments, control and image data may be distinguishable from each other when sent across wireless interface 120 and/or wired interface 122 to facilitate proper handling at main unit 130. In other embodiments, there may be no such distinction. In addition, data/control arbiter 228 may accept control commands from main unit 130 (and/or another device) and respond by appropriate programming of probe 100 circuitry, memory-based tables, registers, etc.

It will be appreciated that in an embodiment where probe 100 is to be used in a sterile environment, the use of wireless interface 120 to main unit 130 may be desirable, as the use of wireless interface 120 avoids many of the problems associated with having a physical connection between probe 100 and main unit 130 that passes into and out of a sterile field. In other embodiments, certain sheathing or sterilization techniques may eliminate or reduce such concerns. In an embodiment where wireless interface 120 is used, controls 104 may be capable of being made sterile so as to enable a treatment provider to use controls 104 while performing ultrasound imaging tasks or the like. However, either wireless interface 120 or wired interface 122, or a combination of both, may be used in connection with an embodiment.

Probe 100 circuitry also includes power supply 236, which may operate to provide drive voltage to the transmitters as well as power to other probe electronics. Power supply 236 may be any type of electrical power storage mechanism, such as one or more batteries or other devices. In one embodiment, power supply 236 may be capable of providing approximately 100V DC under typical transmitter load conditions. Power supply 236 also may also be designed to be small and light enough to fit inside a housing of probe 100, if configured to be hand held by a treatment provider or the like. In addition, power supply management circuitry 230 may also be provided to manage the power provided by power supply 236 to the ultrasound-related circuits of probe 100. Such management functions include monitoring of voltage status and alerts of low-voltage conditions, for example.

Controls 104 may be provided to control probe 100. Control interface 232 may pass user input received from controls 104 to data/control arbiter 228 for processing and action, if necessary. Such control information may also be sent to the main unit 130 through either wireless interface 120 and/or wired interface 122. In addition to sending data to main unit 130, wireless interface 120 may also receive control or other information from main unit 130. This information may include, for example, image acquisition parameters, look-up tables and programming code for field programmable gate arrays (FPGAs) or microcontrollers residing in probe 100, or the like. Controller interface 232 within probe 100 may accept and interpret commands from main unit 130 and configure probe 100 circuitry accordingly.

Figure 11:
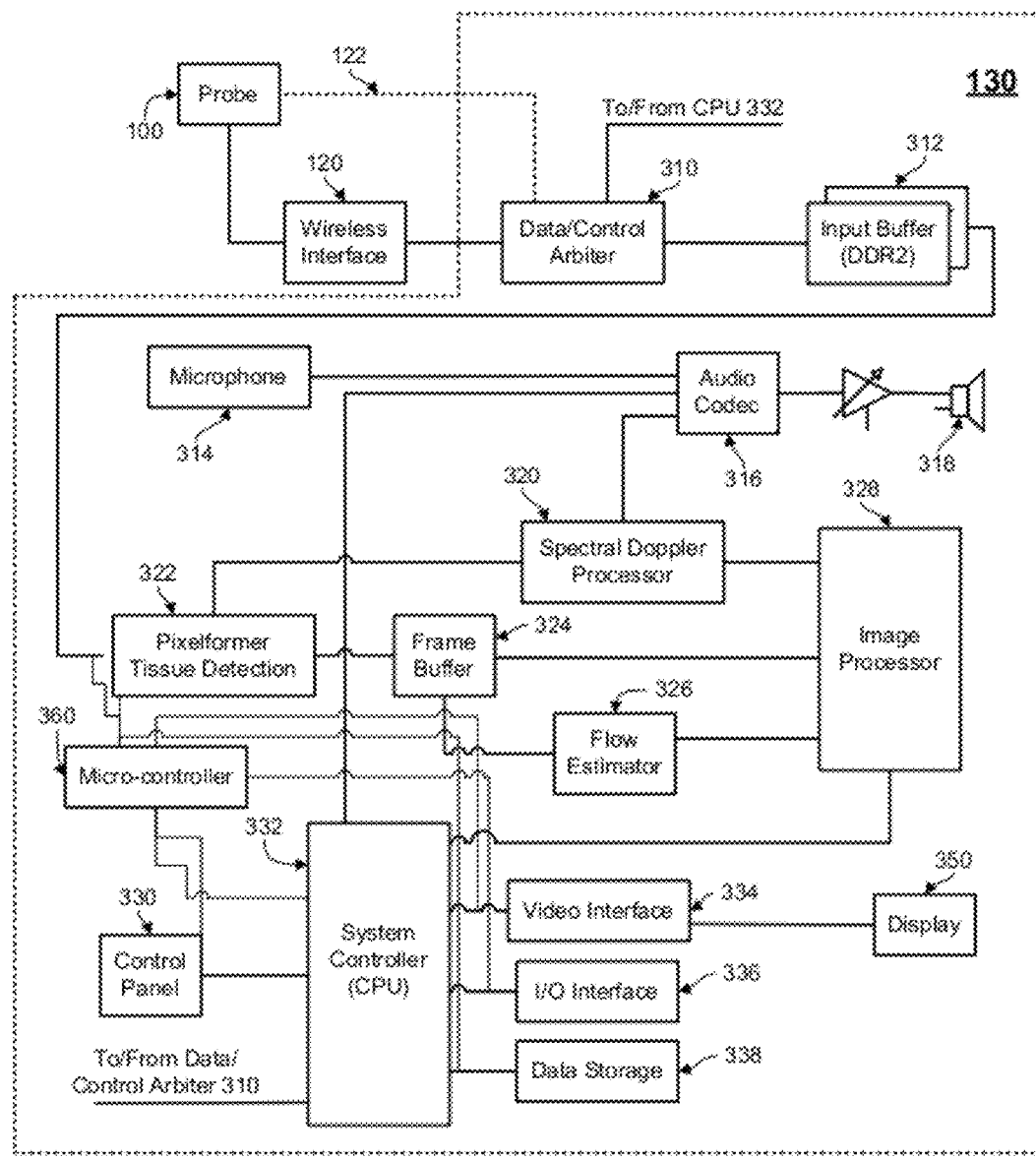
FIG. 11 illustrates a block diagram illustrating various components of an ultrasound system main unit consistent with embodiments.

In light of the described configuration of components of probe 100, an example configuration of components of main unit 130 will be discussed with reference to FIG. 11. It should be noted that any or all of the components illustrated in FIG. 11 may be disposed within one or more housings (not shown in FIG. 11) having any form factor.

As discussed above, probe 100 may be in communication with main unit 130 by way of wireless interface 120 and/or wired interface 122. It will be appreciated that in an embodiment most data transfer occurs from probe 100 to main unit 130, although in some embodiments more data may be transferred from main unit 130 to probe 100. That is, large amounts of image data sent from probe 100 may be received by main unit 130, as well as control information or the like. Control information is managed and, in many cases, generated by Central Processing Unit (CPU) controller 332. CPU controller 332 may also be responsible for configuring circuitry of main unit 130 for an active mode of operation with required setup parameters.

In some embodiments, data/control arbiter 310 may be responsible for extracting control information from the data stream received by wireless interface 120 and/or wired interface 122 and passing it to CPU 332 while sending image data from the data stream to input buffer 312. Data/control arbiter 310 may also receive control information from CPU 332, and may transfer the control information to probe 100 via wireless interface 120 and/or wired interface 122.

A user, such as a treatment provider or the like, may control the operations of main unit 130 using control panel 330. Control panel 330 may include any type of input or output device, such as knobs, pushbuttons, a keyboard, mouse, and/or trackball, etc. Main unit 130 may be powered by any type of power supply (not shown in FIG. 11) such as, for example, a 120 VAC outlet along with AC-DC converter module, and/or a battery, etc.

To facilitate forming an image on display 350 (e.g., pixel-forming—a process that generates an ultrasound image from the image data received from probe 100), the incoming image data may be stored in input buffer 312. In an embodiment, input buffer 312 may be capable of storing up to approximately two frames of data, for example, and may operate in a "ping-pong" fashion whereby a previously received frame of data is processed by pixelformer 322 while a new incoming frame is written to another page of memory in input buffer 312. Pixelformer 322 may be any combination of hardware and/or software that is capable of transforming raw image data received from the receive channels and the transmit events (e.g., from probe 100) into a pixel-based image format. This may be performed, in just one example, by coherently combining data from various transmit and receive elements, or groups of elements, to form an image focused optimally at each pixel. Many variations of this approach may be used in connection with an embodiment. Also, this function may include a beamformer that focuses samples along beam directions. The focused sample data may be converted to a Cartesian format for display on display 350.

Once a frame of complex pixel data has been formed, it may be stored in frame buffer 324 for use by either flow estimator 326 and/or image processor 328. In an embodiment, flow estimator 326 uses, for example, Doppler or cross-correlation methods to determine one or more flow characteristics from the received image (e.g., ultrasound echo) data. Once the flow estimation parameters have been computed, they may be encoded into data values and either stored in frame buffer 324 for access by image processor 328 and/or sent directly to image processor 328. Note that the term "pixel" as used herein typically refers to an image sample, residing on a Cartesian polar and/or non-uniform coordinate grid, computed by processing captured echo signal data. Actual display pixels may differ from these image pixels in various ways. For example, the display pixels, as presented on display 350, may be a scaled, resized, filtered, enhanced, or otherwise modified version of the image pixels referred to herein. These functions may be performed by a processor, for example, image processor 328. Pixel also may refer to any finite level, value, or subcomponent of an image. For example, an image that is made up of a number of subcomponents, both visual and otherwise, may be referred to as a pixel.

Spectral Doppler processor (SDP) 320 may receive focused baseband data from pixelformer 322 from one or more spatial locations within the image region in a periodic or other fashion. The spatial locations may be referred to as range gates. SDP 320 may perform high-pass filtering on the data to remove signal contributions from slow moving tissue or the like. The remaining higher frequency signals from blood flow may be in the normal audio frequency range and these signals may be conventionally presented as an audible signal by speaker 318. Such audio information may, for example, assist a treatment provider in discerning a nerve from a blood vessel and/or a vein from an artery. SDP 320 may also perform spectral analysis via a discrete Fourier transform computation, or other means, to create an image representing a continuously updated flow velocity display (i.e., a time-varying spectrogram of the blood flow signal). The velocity data may be sent through image processor 328 for further processing and display.

A user of main unit 130 may use microphone 314 for controlling main unit 130 using, for example, voice recognition technology. Alternately, or in addition to using microphone 314 for control purposes, a user may use microphone 314 for taking notes while examining a patient. Audio notes may be saved separate from, or along with, video data.

Audio codec 316 may accept audio data input from microphone 314 and may interface with CPU 332 so audio data received by audio codec 316 may be stored and/or interpreted by CPU 332. Such audio interpretation may facilitate system control by way of, for example, voice commands from a user of main unit 130. For example, frequently-used system commands may be made available via voice control. Such commands may also be made available by way of control panel 330, for example. Audio storage facilitates audio annotation of studies for recording patient information, physician notes and the like. The audio data may first be converted to a compressed format such as MP3 before storing in, for example, storage 338. Other standard, proprietary, compressed or uncompressed formats may also be used in connection with an embodiment. Speaker 318 may provide audio output for reviewing stored annotation or for user prompts from main unit 130 resulting from error conditions, warnings, notifications, etc. As mentioned above, Doppler signals may also be output to speaker 318 for user guidance in range gate and/or steering line placement and vessel identification.

Video interface 334 may be in communication with image processor 328 to display 350 by way of CPU 332. Display 350 may be any device that is capable of presenting visual information to a user of main unit 130 such as, for example, an LCD flat panel, CRT monitor, composite video display or the like. Video data may also be sent to storage 338, which may be a VCR, disk drive, USB drive, CD-ROM, DVD or other storage device. Prior to storage, for example, still image frames of data may be encoded in a compressed format such as JPEG, JPEG2000 or the like. Image clips or sequences may be encoded in a format such as MJPEG, MJPEG2000 or a format that includes temporal compression such as MPEG. Other standard or proprietary formats may be used as well.

Image processor 328 may accept either complex and/or detected tissue image data and then filter it temporally (i.e., frame to frame) and spatially to enhance image quality by improving contrast resolution (e.g., by reducing acoustic speckle artifact) and by improving SNR (e.g., by removing random noise). Image processor 328 may also receive flow data and merge it with such tissue data to create a resultant image containing both tissue and flow information. To accomplish this, image processor 328 may use an arbitration process to determine whether each pixel includes flow information or tissue information. Tissue and/or flow pixels may also be resized and/or rescaled to fit different pixel grid dimensions either prior to and/or after arbitration. Pixels may also be overwritten by graphical or textual information. In an embodiment, both the flow arbitration and graphical overlay may occur just prior to image display to allow the tissue and flow images to be processed independently.

Temporal filtering typically may be performed on both the tissue and flow data prior to merging the data. Temporal filtering can yield significant improvements in SNR and contrast resolution of the tissue image and reduced variance of the flow image while still achieving a final displayed temporal resolution suitable for clinical diagnosis. As a result, relatively higher levels of synthetic aperture subsampling may be provided, thereby reducing the required and/or desired number of receiver channels (and, consequently, in some embodiments power consumption of probe 100). Temporal filtering typically involves filtering data from frame to frame using either an FIR or IIR-type filter. In one embodiment, a simple frame averaging method may be used as discussed below, for example.

Temporal filtering and/or persistence may be commonly applied to frames of ultrasound data derived from, for example, tissue echoes. When the acquisition frame rate exceeds the rate of motion of anatomical structures, low-pass filtering across frames can reduce random additive noise while preserving or enhancing image structures. Also, minute degrees of motion—commonly due to patient or operator movement—help to reduce image speckle, which is caused by the interference of acoustic energy from randomly distributed scatterers that are too small to be resolved with the frequency range of ultrasound probe 100. Speckle is coherent by its nature so, in the absence of motion, it may produce the same pseudo-random noise pattern on each image frame. However, small amounts of motion may diversify the speckle enough to make low-pass filtering across frames effective at reducing it.

A simple method of temporal filtering may involve averaging neighboring frames. An example of the recursive version of a moving-average filter is described as follows where $X(n)$ is the input frame acquired at time n, $Y(n)$ is the corresponding output frame, and k is a frame delay factor that sets the size of the averaging window:

$$Y(n)=Y(n-1)+X(n)-X(n-k) \qquad \text{(Equation 1)}$$

Another simple low-pass filter is a first-order IIR filter of the form:

$$Y(n)=C \times Y(n-1)+(1-C) \times X(n) \qquad \text{(Equation 2)}$$

In such an embodiment, the coefficient C sets the filter's time constant and the degree of low-pass filtering applied to the frame sequence. It should be appreciated that Equations (1) and (2) are just examples of possible filters and filtering techniques that may be used in connection with an embodiment.

Control panel 330 may provide pushbuttons, knobs, etc., to allow the user to interact with the system by changing modes, adjusting imaging parameters, and so forth. Control panel 330 may be operatively connected to CPU 332 by way of, for example, a simple low bandwidth serial interface or the like. Main unit 130 may also include one or more I/O interfaces 336 for communication with other devices, computers, a network or the like by way of a computer interface such as USB, USB2, Ethernet or WiFi wireless networking, for example. Such interfaces allow image data or reports to be transferred to a computer or external storage device (e.g., disk drive, CD-ROM or DVD drive, USB drive, flash memory, etc.) for later review or archiving, and may allow an external computer or user to control main unit 130 remotely.

Main unit 130 may include one or more programmable devices, such as micro-controller 360. Micro-controller 360 may include one or more non-volatile memory and/or volatile memory. Micro-controller 360 may be configured to perform numerous functions, such as but not limited to performing calculations, processing signals, and/or performing other automated tasks or actions. Micro-controller 360 may be configured to perform tasks either in cooperation with one or more other elements in main unit 130 or independently of other elements in main unit 130. Micro-controller 360 may include one or more signal processors, discrete signal processors, analog-to-digital converters, logical instruction processors, multi-function processors, programmable logic gates or arrays, memory arrays, EEPROM, and/or EPROM, for example. Micro-controller 360 may be in communication with one or more other elements of main unit 130, such as but not limited to input buffer 312, pixelformer 322, system controller 332, control panel 330, video interface 334, I/O interface 336, and data storage 338. Micro-controller 360 may be configured via the wired interface 122, the wireless interface 120, a direct programming port (not shown), and/or the control panel 330, for example. Micro-controller 360 may be configured to interact with the one or more other elements in main unit 130, including controlling, monitoring, or changing some or all of the functions of the one or more other elements. Embodiments contemplate that micro-controller 360 may be configured to perform one or more functions that may, at least in part, determine the wireless signal quality (WSQ) and/or image quality (ANL) described herein.

Referring now to FIGS. 1-9, embodiments contemplate that the image quality of ultrasound imaging systems may be important, especially when used diagnostically. If imaging performance is compromised for any reason, then providing an indication of imaging degradation may be useful. In ultrasound imaging system embodiments with wireless probes, some level of performance degradation may be likely for reasons such as operation of the probe outside of its allowable range and/or under some other suboptimal conditions. Also, a wireless signal may be degraded by external interference. An indication of the level of degradation, for example in some quantifiable manner, may allow for judgment regarding the reliability of the image content.

Wireless communication systems may be designed to operate effectively within a limited range and perhaps under certain operating conditions. Within those limits, the wireless communication systems may tolerate a degree of noise on the wireless signal while continuing to perform within its intended specifications. Should the limits be violated or exceeded, some performance degradation may result. By way of example, a cordless telephone may be designed to operate within a certain range of the base station to provide usability within the confines of a typical home environment. Should the user walk outside with the handset they may not get very far before voice quality is degraded. The quality degradation may include audible static or garbled speech. Also by way of example, a wireless computer network, such as Wi-Fi (IEEE 802.11) may include a laptop connected to the network. While downloading a large data file, the file may transfer more quickly if the laptop is kept within the usable range of a base station or a wireless router. If the laptop is then brought to a neighbor's house, it may still be able to connect to the network, but may not operate at the same transfer rate as before. Therefore, the same file may take longer to download.

Embodiments may include ultrasound systems that may use a wireless ultrasound probe (e.g., a "remote unit" or "remote probe") to communicate with a base station (e.g., a "main unit"). One or more embodiments may utilize an ultrasound probe that may have a wired connection with the main unit. Systems that include wireless ultrasound probes may suffer performance degradation similar to that described in the two examples described above if the wireless ultrasound system is operated outside of its usable range. Various forms of ultrasound data may be transmitted from the wireless probe to the system (or a main unit). For example, the data may be raw channel data acquired from echoes received by one or more transducer elements of an array. The data may be in either digital or analog form. The data may be further processed by filtering, compressing, or encoding in a way that makes the data more compact or otherwise prepares the data for transmission. The raw channel data may be combined as may be typically done when beamforming. The beamforming function and the data following the beamformer may also be in analog or digital form. The data sent from the probe may also be scan converted so that it closely resembles image pixel data as would be presented to a raster display.

Depending on the nature of the data transferred from the probe, embodiments recognize that wireless signal quality degradation may have different effects on imaging performance. For example, if image pixel data were transferred in digital form across the wireless link, single bit errors resulting from poor wireless signal quality may corrupt associated pixels on the displayed image. Also, if digital or analog channel data is transferred and formed into an image at the base station side of the system (e.g., by combining multiple channel data at each pixel location for the purpose of focusing), single bit errors on one channel may result in some image quality degradation across a range of pixels. Embodiments contemplate numerous other possible scenarios. Various error detection and correction schemes may attempt to reduce the image quality degradation associated with transmission errors. The effectiveness of such schemes may be limited to a certain error rate, beyond which degradation may occur. The imaging performance may be impacted in other ways. For example, the ultrasound signal-to-noise or clutter-to-noise ratios may be reduced, thus limiting penetration or contrast resolution. Also, by way of example, and not limitation, spatial resolution may also be degraded if beam side lobes are increased relative to the main beam. Additionally, real-time imaging of dynamic structures or blood flow may suffer degradation if the frame rate is compromised, for example.

Embodiments contemplate that there may be visible signs of image performance degradation. Image noise or artifacts may be discernible from normal anatomical features by a user. Embodiments also contemplate that some image performance degradation may be more subtle, or may perhaps lead to confusion about the image content. For at least these reasons, it may be useful to inform the user that some image quality degradation may have occurred or warn users if the degradation may be severe. Embodiments contemplate that one or more quantifiable imaging performance parameters may be included in one or more indicators that may be presented to the user in either a displayed or audible form, or some other form. For example, a bar graph or meter may be displayed and updated in real-time while imaging. Also, a performance value may also be presented such as a signal-to-noise ratio relative to an ideal or "maximum quality" case, for example. An index or percent degradation may also be presented to the user.

Embodiments contemplate that the index may be derived from one or more imaging performance measures such as those imaging performance measures described herein. In one or more embodiments, the performance measurements may be made during system development and associated with markers of overall system performance such as, but not limited to, one or more levels of wireless signal quality, wireless bits errors, or other markers of overall (or "ultimate") system performance. These markers may be computed in real-time. Also, the associated imaging performance parameters that may be respectively associated with the markers may be computed in real-time. Alternatively or additionally, the associated imaging performance parameters may be predetermined or determined offline.

Embodiments contemplate that, perhaps during development, the probe may continuously transmit one or more frames of data representative of anatomical structures. During the transmission, the base station may compare the incoming frames to known frames (e.g., known "good" frames) and compute imaging performance characteristics and/or derive statistics, perhaps under various wireless signal conditions. The computed imaging performance characteristics and/or derived statistics may represent an expected imaging performance of the system under the tested conditions. For example, embodiments contemplate that when a certain wireless signal quality or other system performance marker is detected during live scanning, the associated imaging performance parameters may be displayed.

Alternatively or additionally, embodiments contemplate that one or more imaging performance parameters may be computed directly by the ultrasound system, such as in real-time. For example, one or more known (or predetermined) data frames or other types of known or predetermined data may be transmitted periodically from the system to assess imaging performance during live scanning. For example, the known or predetermined data may include one or more predetermined characteristics, such as but not limited to a gold code, a pseudo noise code, a maximum length sequence, or the like. Also by way of example, the known or predetermined data may include one or more predetermined characteristics of data from which an image may be derivable. Embodiments also contemplate that other imaging performance parameters may be discernible, perhaps in real time, directly from the incoming image data (e.g., image noise level, contrast resolution, and/or spatial resolution, or the like).

One or more embodiments contemplate that image noise may be characterized by measuring the probability density of the image data, or other data used to derive the image, and/or by examining the data properties, or by other measures such as the standard deviation, for example. Embodiments contemplate that contrast resolution may refer to the ability to distinguish differences in image intensity. In one or more embodiments, contrast resolution may be computed by $(Sa-Sb)/(Sa+Sb)$, where Sa and Sb refer to two signal intensities, among other computations, for example. Embodiments contemplate that spatial resolution may refer to the ability to distinguish small details in the image. One or more embodiments contemplate that spatial resolution could be estimated by measuring the radius of a smallest dot and/or the smallest distance between two resolvable dots, or via other computations, for example.

Alternatively or additionally, embodiments contemplate that image noise may also be measurable by computing correlations of pixels across the image frame and/or with neighboring frames. Embodiments contemplate that image characteristics may be determined that may include image noise, an amount of image noise, and/or a type of image noise. For example, embodiments contemplate that one or more of speckle, an amount of speckle, or a speckle pattern may be respectively characterized for a respective amount of one or more image configurations. Embodiments also contemplate that statistics, such as a Coefficient of Variation (CV), which may be defined as the ratio of the standard deviation to the mean, may be predictable across a region of an ultrasound image, and may differ from random noise or noise introduced as a result data bit errors. Computation of the CV, or other standardized moment in real-time, may provide a way to estimate the amount of noise present in the image, and may therefore be used as a measure of imaging performance.

Embodiments contemplate that other statistical measures may also be used to estimate image noise and distinguish image noise from the variability that may be inherent in ultrasound images. Also, embodiments recognize that ultrasound images may not vary abruptly from frame to frame but instead may tend to change gradually as long as the frame rate may be high enough to capture the underlying anatomic motion. Noise resulting from random bit errors, however, may change significantly from frame to frame. Embodiments contemplate that one or more measures of the average noise content of an image, or image sequence, may be computed using the frame to frame variability of either input channel data, pixel data, or data that may be derived from the input channel data, for example. Embodiments contemplate that CV and/or pixel variability, among other measures, may be computed in real-time by the main unit, with or without sending predefined data across the wireless communication link and, in one or more embodiments, displayed on the ultrasound image.

Embodiments contemplate that a combination of the techniques described herein may be used to determine imaging performance. In one or more embodiments, the one or more indicators that may be used to determine imaging performance (as determined by analysis, for example) may be prioritized as the one or more indicators that may be used to determine the imaging performance. Embodiments contemplate blending the results of multiple indicators. For example, a bit error rate or average image difference computation may be determined from the transfer of predetermined data. These results may be blended with a real-time determination of image noise using the statistical methods described herein, for example.

Embodiments contemplate that, perhaps regardless of the technique used to determine the image performance, a performance indicator or indicators may be presented to the user in a readily understandable form. The imaging performance indicator(s) associated with one or each data frame, or group of frames (and/or the data from which the frames or groups of frames are derivable), may be stored with, or stored in a way associated with, the data and recalled whenever the image may be recalled to the display. The user may discern the level of imaging performance associated with the image being reviewed. Embodiments contemplate that the image (and/or the data from which the image may be derived) and/or the imaging performance indicator(s) may be stored in system memory and/or stored on a hard drive or other non-volatile storage medium.

Embodiments contemplate that imaging performance may be impacted by errors that may not be correctable by a bit error correction function. Such uncorrectable bit errors may cause artifacts or noise to appear in the image. In embodiments, the impact of wireless signal quality (WSQ) on imaging performance may be measured. Correlation of the WSQ measurement may be made to a known measure of imaging performance. The WSQ meter level may range from zero to six (0 to 6), for example, with 0 being the minimum quality and 6 being the maximum, for example. The image may be blanked when the WSQ is 0 or substantially 0. At WSQ levels 4 through 6, no bit errors may occur. In some embodiments, the measurement process may be particularly concerned with WSQ levels 1 through 3.

Embodiments contemplate that the image performance measurement techniques may be implemented in tissue (B-mode) and/or color flow Doppler mode. In both modes, the measured imaging performance criterion may be the average noise level (ANL)—which may be brought about by wireless link bit errors, for example.

Embodiments contemplate that tissue imaging performance due to wireless bit errors may be evaluated by capturing a frame of raw data within the wireless ultrasound probe and sending the same data repeatedly to the base station (or main unit). With the probe held close to the base station such that no bit errors occur, a frame may be captured on the base station so that it can be used as a reference frame for subsequent measurements. The base station then may compare the reference frame to each incoming frame and may compute their mean absolute deviation (MAD). If there are no errors, or substantially no errors, the MAD may be zero. A greater number of bit errors may result in an increased number of image pixel differences which in turn may increase the MAD. Since tissue pixel intensity may relate to a given number of decibels (dB) per bit, the MAD value may be expressed in dB. The MAD measurement may vary from frame to frame, so it may be computed over one or more frames. Individual MAD measurements may be averaged over an eight-frame interval, for example, and the averaged MAD value may be sampled every half second and logged in a data file along with the current WSQ level. The log file may be further analyzed offline to perhaps generate more detailed ANL statistics for each WSQ level. In one or more embodiments the ANL may be based on the upper limit, or a noise level expected for a given WSQ level.

Embodiments contemplate that bit errors in Doppler imaging may manifest primarily as an increase in the background noise level. This may be measured by imaging with the ultrasound probe and system (main unit) in close proximity and setting the Doppler gain level so that background noise may be just below a reject (or "black") level, for example. Should the wireless signal degrade, any increased noise level may be removed by lowering the gain as required to remove the noise. The gain difference between the ideal, or reference, level may represent the ANL due to wireless bit errors. This ANL may also be expressed in dB.

Embodiments contemplate that prior to performing actual WSQ measurements, bit errors may be injected into an error-free data stream via a pseudo-random binary sequence, for example. This may be used to verify the ANL measurement process as well as the lower four WSQ meter levels. The probability of a one (error) occurring in the pseudo-random sequence may be programmable, and may programmed to be 0.8%, 1.6%, 3.1%, 6.3%, or 12.5%, for example. The displayed WSQ meter levels may represent an approximate number of bit errors as shown in Table 1, by way of example and not limitation.

TABLE 1

| WSQ Level | Percentage of Bit Errors (P) |
| --- | --- |
| 0 | P > 8 |
| 1 | 4 < P ≤ 8 |
| 2 | 1 < P ≤ 4 |
| 3 | 0 < P ≤ 1 |
| 4-6 | 0 |

Further by way of example, bit error rates (BERs) of 0.8%, 1.6%, 3.1%, 6.3%, and 12.5%, may produce WSQ levels of 3, 2, 2, 1, and 0, respectively.

Embodiments contemplate that to analyze tissue ANL variability, the ANL may be computed for each transducer contemplated (such as representative transducers L8-3, L12-5, and C5-2, for example) over a range of depth settings and image characteristics at the exemplary five error rates in both color flow (e.g., color Doppler) and tissue modes (e.g., B-mode). The ANL may be stable for a given probe at BERs of 0.8% through 3.1%, corresponding to WSQ meter levels of 3 and 2. Significant variability of the ANL measurement may be found at the higher BERs of 6.3% and 12.5% (WSQ meter levels of 1 and 0). At the 12.5% BER (WSQ of 0) this may be mitigated because the image may be blanked, so ANL may not need to be displayed, for example. Embodiments contemplate that the variability of the ANL may be due to variations of the image characteristics (i.e., various hyperechoic and hypoechoic regions of a tissue phantom, for example). For example, images of parenchyma with relatively uniform intensity throughout may produce lower ANL values at higher BERs than images with large hypoechoic regions. With the uniform parenchyma images, lowering the gain decreased the ANL over all BERs, but increasing gain beyond the default setting of 9 may make no difference. Adding bright, hyperechoic lines to the image may not change the ANL significantly from that measured with uniform parenchyma.

Viewing images with the highest BERs, embodiments recognize that it may not be apparent that there is actually any more noise in the hypoechoic regions compared to the regions of uniform parenchyma. The difference in the noise level relative to the low tissue level may be greater, hence the ANL may be higher. Table 2 illustrates exemplary ANL variability over image characteristics with representative transducers. In one or more embodiments, these transducers may be representative because more variation of the image characteristics may be possible using a tissue phantom, for example.

TABLE 2

Exemplary Tissue Image Content Variations (depth of 4 cm)

| | BER 0.8% WSQ 3 | BER 1.6% WSQ 2 | BER 3.1% WSQ 2 | BER 6.3% WSQ 1 | BER 12.5% WSQ 0 |
| --- | --- | --- | --- | --- | --- |
| L8 Parenchyma G1 | 0.24 | 0.35 | 0.59 | 1.12 | 2.35 |
| L8 Parenchyma G9 | 0.35 | 0.53 | 0.94 | 1.65 | 2.94 |
| L8 Parenchyma G16 | 0.35 | 0.53 | 0.94 | 1.65 | 2.94 |
| L8 Bright lines | 0.35 | 0.59 | 0.94 | 1.65 | 3.00 |
| L8 Dark Cyst | 0.35 | 0.53 | 0.94 | 2.40 | 5.29 |
| L12 Parenchyma G1 | 0.24 | 0.35 | 0.59 | 1.00 | 1.82 |
| L12 Parenchyma G9 | 0.41 | 0.59 | 0.88 | 1.41 | 2.41 |
| L12 Parenchyma G16 | 0.41 | 0.59 | 0.88 | 1.41 | 2.41 |
| L12 Bright lines | 0.41 | 0.59 | 0.94 | 1.47 | 2.53 |
| L12 Dark Cyst | 0.41 | 0.65 | 1.00 | 1.71 | 3.29 |

Several of the illustrated tissue measurements may be repeated in Color Doppler mode and may be found not to change. ANL may also be measured for the Color Doppler portion of the image. The Color Doppler ANL may not vary over the full range of depth settings. The results of a sample measurement are shown in Table 3. Based on image appearances, the Color Doppler ANL may be lower than the tissue ANL under some or all conditions. In one or more embodiments, since the tissue ANL may represent a "worst case" noise level, and since the tissue ANL may be displayed along with the Color Doppler portion of the image, the tissue ANL may be the only level displayed while in Color Doppler Mode.

TABLE 3

Exemplary Color Doppler ANL versus BER

| | BER 0.8% WSQ 3 | BER 1.6% WSQ 2 | BER 3.1% WSQ 2 | BER 6.3% WSQ 1 | BER 12.5% WSQ 0 |
| --- | --- | --- | --- | --- | --- |
| L8 Probe | 0 | 0 | 0 | 0.4 | 1.6 |

By way of example, and not limitation, some or all of the following ANL measurements shown in Table 4 may be derived from images of a tissue phantom with a hypoechoic cyst 7 mm in diameter to ensure "worst case" conditions as described above. The cyst may be imaged longitudinally to maximize the hypoechoic area as shown in FIG. 1. Even when the same phantom view may be used, different probes and depth ranges may produce significant variations in the image content and intensity. Table 4 reflects some of that variability. By way of example, and not limitation, a representative worst case setting for each probe is indicated with an asterisk.

TABLE 4

Exemplary Tissue ANL (dB) for each Simulated Bit Error Percentage

|  | BER 0.8% WSQ 3 | BER 1.6% WSQ 2 | BER 3.1% WSQ 2 | BER 6.3% WSQ 1 | BER 12.5% WSQ 0 |
|---|---|---|---|---|---|
| L8-3, 3 cm | 0.35 | 0.53 | 0.88 | 2.00 | 4.18 |
| L8-3, 4 cm* | 0.35 | 0.53 | 0.88 | 2.20 | 5.00 |
| L8-3, 5 cm | 0.35 | 0.53 | 0.88 | 1.96 | 4.41 |
| L8-3, 6 cm | 0.29 | 0.47 | 0.82 | 1.76 | 3.76 |
| L12-5, 2 cm | 0.35 | 0.59 | 0.88 | 1.47 | 2.59 |
| L12-5, 3 cm | 0.35 | 0.53 | 0.88 | 1.47 | 2.82 |
| L12-5, 4 cm* | 0.41 | 0.59 | 0.94 | 1.59 | 3.24 |
| C5-2, 8 cm | 0.43 | 0.69 | 0.96 | 1.47 | 2.43 |
| C5-2, 12 cm | 0.53 | 0.71 | 1.08 | 1.61 | 2.51 |
| C5-2, 16 cm | 0.64 | 0.92 | 1.28 | 1.97 | 3.68 |
| C5-2, 18 cm* | 0.75 | 1.03 | 1.40 | 2.15 | 4.02 |

One or more embodiments contemplate that, perhaps from the variability analysis described in the previous section, "worst case" image characteristics and system settings may be identified for each probe type. Embodiments contemplate that imaging performance measurements may be computed under these worst case imaging settings, and over a full range of WSQ conditions and probe/system placement scenarios. Imaging performance measurements may be taken at each WSQ level. Furthermore, each WSQ level may be arrived at by manipulating the wireless signal conditions in at least three distinct ways, for example. Embodiments contemplate the use of a direct line-of-sight between the probe and base station while their separation distance may be increased in order to achieve the various WSQ levels. Other embodiments contemplate that a nominal separation distance may be maintained between the probe and base station of approximately two meters while the base station's angle with respect to the line-of-sight may be varied. Other embodiments contemplate that a two-meter separation distance may be maintained while obstructing the signal path either partially or completely in order to reduce WSQ.

Imaging performance may be evaluated for each WSQ level using one or more of the at least three signal degradation methods. Since at its lowest levels, the WSQ meter may essentially track the approximate bit error rate, the ANL may be well correlated with WSQ meter levels 2 and 3 with simulated bit errors. More ANL variability may occur at levels 0 and 1. Nevertheless, for completeness, numerous probe types (such as L8-3, L12-4, and C5-2, for example) may be measured over some or all WSQ levels including levels 4 through 6 where no errors may occur. Little or no tissue ANL differences may be seen between B-mode and Color Doppler mode. Therefore, B-mode may be used alone or in combination for tissue ANL measurements. Also, the worst case phantom image and system settings may be used for each probe. While WSQ level 0 may be used to determine the maximum ANL for WSQ level 1, its associated ANL may not be useful during live scanning because the image may be blanked. Instead of an ANL value being displayed for WSQ of 0, in one or more embodiments a warning may be presented via some display or other indication to inform users that the wireless signal may be inadequate.

Embodiments contemplate that in situations where the ANL may be above a predetermined threshold, for example over 1.0 dB, the image may be blanked and/or the ANL condition may be alarmed to the user via an audible and/or visual indicator. For example, one or more embodiments contemplate that, upon a determination that the ANL exceeds the predetermined threshold, an indication that may be based at least in part of the comparison may be provided to an operator. For example, an image screen may be at least partially blanked (or turned to a solid color (perhaps predetermined), or turned to a predetermined pattern, or display a predetermined message) and/or a horn and/or a flashing light may indicate an ANL with a level that indicates that the quality of the image may be in question.

By way of further example, the measure of performance may be displayed, a difference between the threshold and the measure of performance may be displayed, a light may be at least a partially illuminated, an audible predetermined message may be presented, and/or an audible predetermined sound may be presented to indicate that an ANL with a level that indicates that the quality of the image may be in question. Embodiments generally contemplate that the described indications may be provided in situations in which the image performance compares unfavorably to a predetermined threshold (e.g., the comparison indicates that an operator should have concern about the performance of the image).

Bit errors in Doppler imaging may manifest as an increase in the background noise level. This may be measured by first imaging with the probe and system in close proximity and setting the Doppler gain level so that background noise may be just below a reject (black) level. As the wireless signal may degrade, increased noise level may be removed by lowering the gain as required to remove the noise. The gain difference between the ideal, or reference, level may represent the noise level due to wireless bit errors, or other issues. This noise level may be expressed in decibels (dB), for example.

Figure 2:
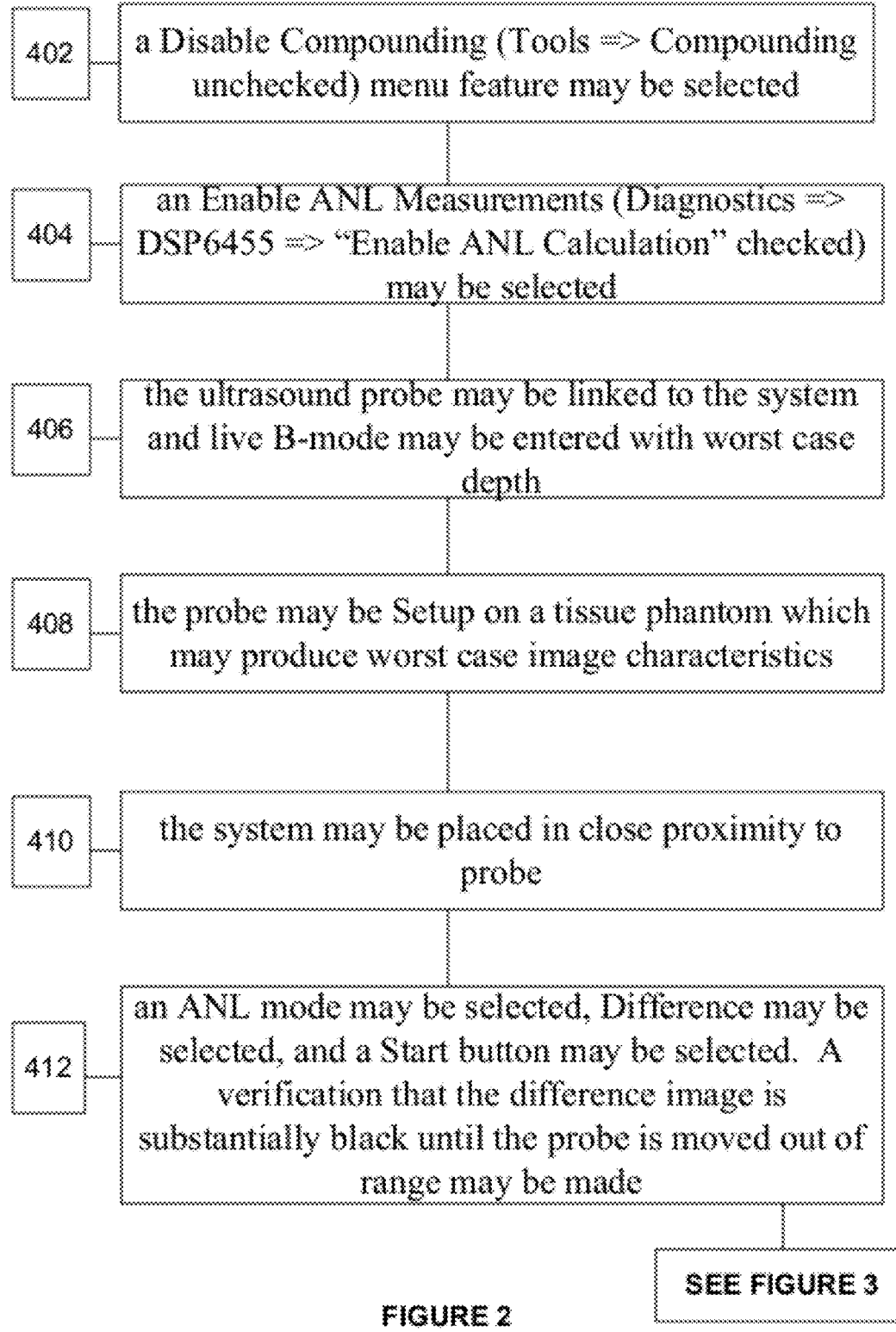
FIG. 2 illustrates a flowchart of an exemplary technique consistent with embodiments.
Figure 3:
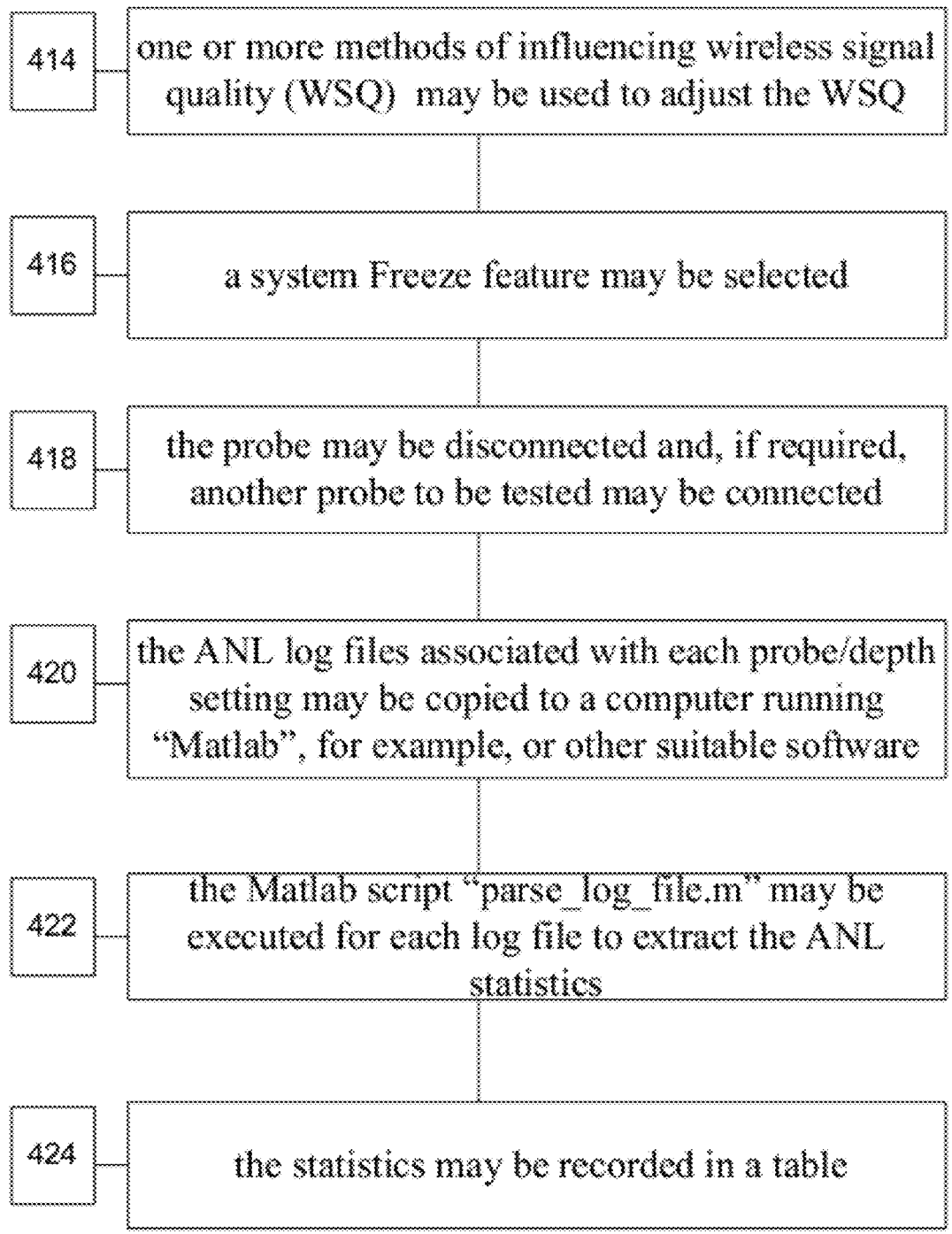
FIG. 3 illustrates a flowchart of an exemplary technique consistent with embodiments.

Embodiments contemplate that the ANL may be determined without the image being either partially or fully processed or converted into a displayable form. Alternative embodiments contemplate that the ANL may be determined with either a partially or fully processed or converted image, capable of being displayed. Embodiments contemplate ANL measurement methods for an ultrasound system with at least one processing device and one more interactive user interfaces. Referring to FIGS. 2 and 3, in an embodiment, at 402 a Disable Compounding (Tools=>Compounding unchecked) menu feature may be selected. At 404, an Enable ANL Measurements (Diagnostics=>DSP6455=>"Enable ANL Calculation" checked) may be selected. At 406, the ultrasound probe may be linked to the system and live B-mode may be entered with worst case depth as determined previously. At 408, the probe may be setup on a tissue phantom which may produce worst case image characteristics (refer to FIG. 1). At 410, the system may be placed in close proximity to probe (less than 1 meter, for example). The live image may be updated on the system display and the WSQ meter should be at 6 bars (approximately).

At 412, an ANL mode may be selected in the lower right of the display, then Difference may be selected, and a Start button may be selected. A verification that the difference image is substantially black until the probe is moved out of range may be made. At 414, one or more of the methods of influencing wireless signal quality may be used. For the one method, a metal plate may be used to partially or completely obstruct the signal path in order to achieve all WSQ levels. For another method, the display's angle relative to the probe line-of-sight may be gradually increased to reduce WSQ and attain some or all WSQ levels. For yet another method, the probe and main unit may be gradually separated by a distance sufficient to reduce the WSQ level. With one or all of the methods, dwelling on a particular level for approximately several seconds before increasing the distance/angle/obstruction may reduce the level further. If the level may fluctuate rapidly between two or more levels, then adjusting the distance/angle/obstruction and/or reposition slightly may achieve better stability. This may take some continuous adjustment to ensure that levels are maintained for several consecutive seconds.

At 416, Once all levels have been achieved with one or more of the methods, a system Freeze feature may be selected. At 418, the probe may be disconnected and, if required, a next probe to be tested may be connected. 406-418 may be repeated, as necessary, for another probe type until all probes have been tested. At 420, once the ANL measurement data have been gathered, the ANL log files associated with each probe/depth setting may be copied to a computer running "Matlab", for example, or other suitable software (the log files may reside in the /usr/ANL folder, for example). By way of example and not limitation, other suitable software that may be used includes Microsoft's Excel, Sage, Eclipse and Python, or user written software. At 422, the Matlab script "parse_log_file.m" may be executed for each log file to extract the ANL statistics. At 424, the statistics may be recorded in a table such as Table 5, for example.

TABLE 5

| Probe | Depth (cm) | ANL Mean, Max (dB) | | |
|---|---|---|---|---|
| | | WSQ 3 | WSQ 2 | WSQ 1 |
| L8-3 | 4 cm | Mean 0.1 | Mean 0.8 | Mean 2.9 |
| | | Max 0.4 | Max 1.5 | Max 4.1 |
| L12-5 | 4 cm | Mean 0.2 | Mean 0.8 | Mean 2.1 |
| | | Max 0.5 | Max 1.3 | Max 2.9 |
| C5-2 | 18 cm | Mean 0.4 | Mean 1.1 | Mean 2.3 |
| | | Max 0.7 | Max 1.7 | Max 3.2 |

Figure 4:
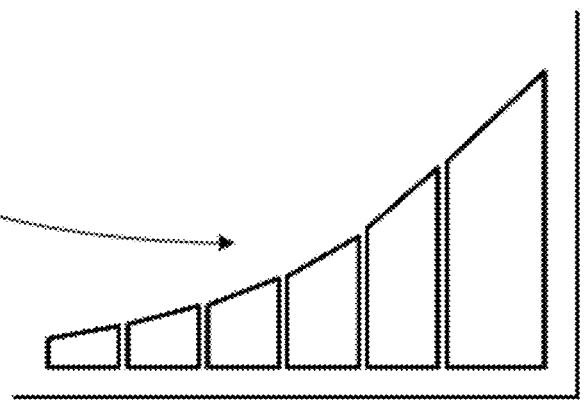
FIG. 4 depicts an image of an exemplary display of an image quality measurement and a wireless signal quality measurement consistent with embodiments.

Referring to FIG. 4, embodiments contemplate that the system (or main unit) may display a wireless signal quality (WSQ) meter (e.g., bar indicator), representing the wireless probe signal quality. A user may position or adjust the probe and/or the system to maximize the signal quality shown in the display. The value displayed above the wireless imaging quality meter, which may be labeled as the Average Noise Level (ANL), may provide a measure of the potential for a compromised wireless link to introduce noise artifacts into the image. ANL may be correlated to the wireless signal quality display (bars) but may be a separate index, for example.

A system user may monitor the two measurements (WSQ and ANL) for optimal wireless probe operation. ANL may be displayed in dB, for example. An ANL value of 0.0 may represent an optimal setting and may indicate that the image has no artifacts due to noise in the wireless link, or other source of image degradation. Embodiments contemplate that by staying inside approximately a 3 meter range and maintaining a good line-of-sight between the probe and the main unit, without obstructing the antennas, the user may operate the probe/system with good results. Embodiments contemplate that the Wireless Signal Quality Meter and ANL value may be used to indicate wireless probe link quality.

Embodiments contemplate that the number of wireless signal quality meter bars and the ANL value may correlate to the potential of an artifact being introduced because of a weak signal. In one or more embodiments, a "best" signal quality level may be represented by six bars, for example. As the number of bars in the meter decreases to three and below, there is a possibility that errors in the wireless link may contribute to noise in the image. A user may refer to the display as a guide to maintain a good link and may be alert to the number of bars displayed in the meter. If the number of bars drops to three, there is a possibility of artifact appearing in the image. Repositioning may improve the link quality. If the number of bars in the meter drops below three, there may be an increased chance that artifact may appear on the screen. This artifact may appear as bright, streaky lines, as illustrated in FIG. 5.

Figure 5:
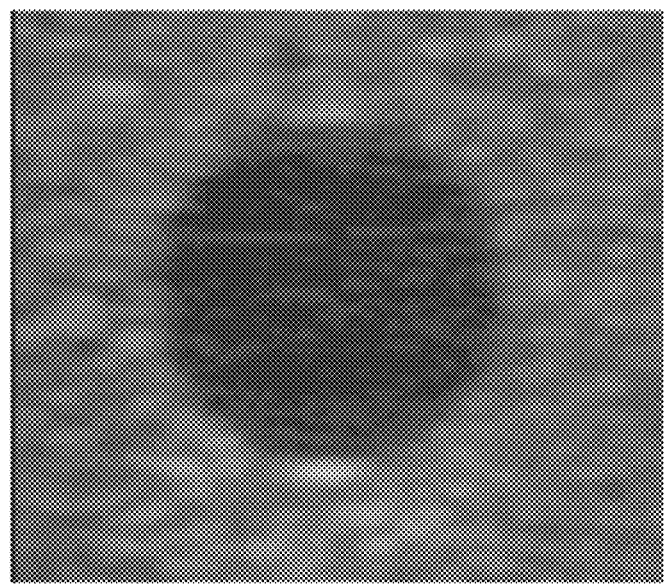
FIG. 5 depicts an image of a cyst containing streaks and image artifacts.

Referring to FIG. 5, the streaks of noise seen in the cyst (to the left) may occur when the wireless signal quality may be compromised. A user confronted with such noise may reposition to improve the link quality. Such noise as seen in FIG. 5 may mean the probe may be too far away from the main unit, the probe may be out of a line-of-sight to the main unit, there may be an obstruction between the probe antennas and the main unit antennas, or some combination of these.

Figure 6:
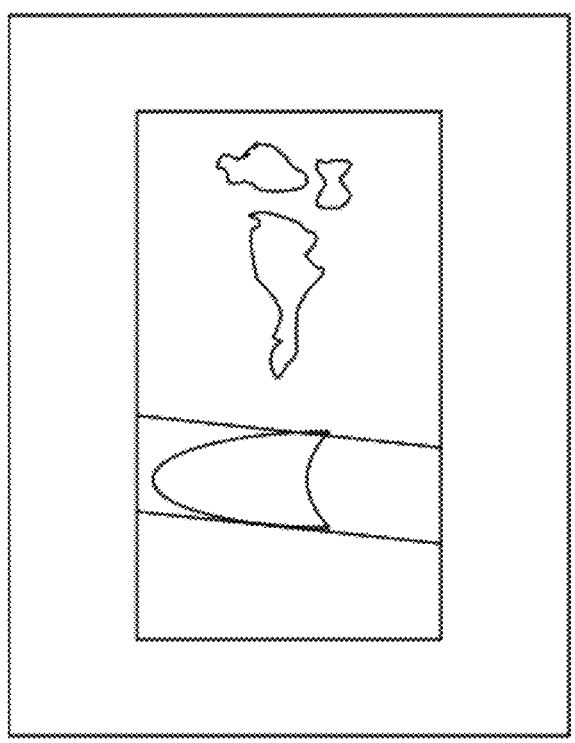
FIG. 6 illustrates an image in Doppler mode that includes excess background noise consistent with embodiments.

Referring to FIG. 6, in Doppler mode, which may include the use of color images (not shown), if the wireless signal quality is compromised, excess background noise, as demonstrated in the image illustrated in FIG. 6 may occur. If confronted by such noise, a user may reposition to improve the link quality. The probe may be too far away from the main unit, the probe may be out of a line-of-sight to the main unit, or there may be an obstruction between the probe antennas and the main unit antennas, or some combination of these.

Referring to FIG. 7, there may be a total of six segments or bars in the WSQ meter. Four to six (4-6) bars may represent a very strong signal. Three (3) bars may represent a good signal but one which may contain noise introduced by signal quality degradation. Less than three bars may represent a weakened signal, and zero may indicate that the signal quality is below a usable level. During wireless scanning a user may use the separate ANL level, in accordance with the exemplary guidance in FIG. 7, which is offered by way of example and not limitation. The user may use the wireless signal quality meter and the ANL to obtain optimal wireless imaging.

Embodiments contemplate that the ANL and WSQ may be different measures and may vary independently. The WSQ measurement may indicate the quality of the wireless link and the bit error rate that results from poor signal quality. The ANL measurement may indicate how the bit errors, and other issues, may affect the image itself. It may be that more bit errors result in increased ANL, but the ANL may vary for a fixed bit error rate depending on many factors such as, but not limited to: the bit-error correction scheme, the way the image is constructed from the raw transferred data, the represented anatomical information, among others, for example. FIG. 8 illustrates WSQ and ANL variances in which the same probe may experience the same WSQ, at different scanning depths, but may produce different ANL results and image results. FIG. 9 illustrates WSQ and ANL variances in which different probes may experience the same WSQ, at different scanning depths, but may produce different ANL results and image results. As the ANL approaches 1 dB, system users may need to be aware of noise appearing in the image. The examples of FIGS. 8 and 9 illustrate how with the same WSQ but varying scanning depths, or varying probes, the ANL may be under 1, approximately 1, or over 1.

Embodiments contemplate that tissue imaging performance due to wireless bit errors, or other issues, may be evaluated by capturing a frame of raw data within the probe and sending the same data repeatedly to the base station (or a main unit). With the probe held close to the base station such that no bit errors may occur, a frame may be captured on the base station so that it can be used as a reference frame for subsequent measurements. The base station may then compare the reference frame to each incoming frame and may compute their mean absolute deviation (MAD). If there are no errors, the MAD may be zero. A greater number of bit errors may result in an increased number of image pixel differences which in turn may increase the MAD. Since tissue pixel intensity may relate to a given number of dB per bit, the MAD value may be expressed in dB. The MAD measurement may vary from frame to frame, so it may be computed over many frames. Individual MAD measurements may be averaged over an eight-frame interval (for example), and the averaged MAD value may be sampled every half second and may be logged in a data file along with the current WSQ level. The log file may be further analyzed offline to generate the final ANL statistics for each WSQ level. The ANL may be based on the upper limit, or worst case, noise level expected for a given WSQ level.

Embodiments contemplate that the MAD may be computed, for example, as follows for each incoming image frame:

$$MAD = \frac{1}{N}\sum_{k=1}^{N} |X(k) - R(k)| \qquad \text{Equation (3)}$$

Where N may be the number of pixels per frame, R may be the reference image data frame (with no bit errors), and X may be the current image data frame that may contain errors. X and R may be in units of dB as determined by the displayed image dynamic range. The MAD may then be averaged over eight frames (for example) to compute $MAD_A$ as follows:

$$MAD_A = \frac{1}{8}\sum_{k=1}^{8} MAD(k) \qquad \text{Equation (4)}$$

The ANL may then be computed for each WSQ by finding the maximum $MAD_A$ over one or more observations at a given WSQ level as follows:

$$ANL = MAX\{MAD_A(1), MAD_A(2), \ldots, MAD_A(M)\} \qquad \text{Equation (5)}$$

Where M may be the number of independent $MAD_A$ measurements made at a given WSQ level.

Embodiments contemplate that when wireless data may be received by the main unit of the ultrasound system, an approximation of signal-to-noise ratio (SNR) may be computed for each incoming ultra-wideband (UWB) pulse by comparing the pulse magnitude to an expected pulse shape. The closer the pulse magnitude matches the ideal shape, the higher may be the SNR value. The UWB signal may be over-sampled at the receiver by a factor of 8, and a function within the receiver may keep the detected pulse centered within the 8-sample window. With the pulse relatively well centered, the magnitude shape may be approximately {0, 0, 0.5, 1, 1, 0.5, 0, 0}. An odd phase with shape {0, 0.25, 0.75, 1, 0.75, 0.25, 0, 0} may also be tested and the best match may determine the current pulse phase. To compute the "signal" and "noise", the eight subsamples {S0, S1, ..., S7} may be weighted and summed as follows:

SIGNAL=0.5*S2+S3+S4+0.5*S5(even phase) or
0.25*S1+0.75*S2+S3+0.75*S4+0.25*S5(odd
phase) Equation (6)

NOISE=S0+S1+0.5*S2+0.5*S5+S6+S7(even phase)
or S0+0.75*S1+0.25*S2+0.25*S4+0.75*S5+S6+
S7(odd phase) Equation (7)

The logarithm of each quantity may then be computed and their difference may be taken to form the SNR as follows (a fixed offset is added to ensure a minimum of 0).

SNR=LOG(SIGNAL)−LOG(NOISE)+OFFSET Equation (8)

The SNR measurement may be averaged over approximately 82 million samples over a half-second interval. Thresholds may then be applied to quantize the quantity down to a range of integers 0 through 6. By way of example, and not limitation, the extremes of 6 and 0 represent essentially a best and a worst case level.

Embodiments contemplate that the transmitted wireless data may be formed into discrete packets of bits that may be accompanied by one or more synchronization codes (or sync codes). The sync code may be a maximal sequence designed to support robust bit synchronization, for example. The received bit stream may be compared to an expected sync code at one or more bit positions in order to detect packet boundaries. The bit errors that may be detected in the sync sequence may be accumulated, and a further accumulation may be performed over one or more additional interrogation cycles to provide a reasonable estimate of the current bit error rate. Averaging intervals may vary. For example, averaging intervals may range from approximately one-quarter (0.25) second to 3 seconds. Thresholds may be applied to quantize the measurement into coarse bit error rate segments, such as but not limited to 0-1%, 1-4%, 4-8%, and >8%, for example.

Embodiments contemplate that the bit packets may be transmitted and received even if no actual ultrasound acquisition (image) data is available for transmission. Therefore, the SNR and Sync Code Bit Error measurements may be active continuously, even when image acquisition may be paused or intermittently inactive. When image data is transferred, it may be accompanied by frame boundary indicators that may facilitate the further parsing of the bit stream into acquisition-related segments and data samples. Some or all of the received data bits may be protected by parity bits for bit error management. A single parity bit may protect two data bits. Parity bit errors may be accumulated over an approximate one-half second interval to provide another measure of link quality. In this way, the parity bit error measure may be similar to the Sync Code Bit Error measure but may be more robust because it may use a larger statistical sampling of bits (approximately 100 times the number of bits considered in each Sync Code Bit Error interval, for example).

Embodiments contemplate that the parity error count may slightly underestimate the actual bit error rate because only single bit errors may be counted accurately. Three-bit errors may be detected but only counted as 1, and two-bit errors may not be detected at all, or may not be detected accurately each time. Therefore, when the parity bit error measurement may be quantized into coarse error rate segments of 0-1%, 1-4%, 4-8%, and >8%, the thresholds may be reduced to account for the probability of double bit errors thus making the segments effectively equivalent to the actual desired bit error rates.

Embodiments contemplate that the measurements may be coalesced to form a single wireless signal quality (WSQ) measurement ranging from integers 0 to 6, for example. Since the Parity Bit Error measurement may be the most reliable at determining bit error rates, and bit error rate may be closely correlated with imaging performance, it may dominate the lower scale of the WSQ range from 0 to 3. A WSQ level of 0 may represent a bit error rate of greater than 8%, 1 represents 4-8% errors, 2 represents 1-4% errors, and 3 represents 0-1% errors, for example. If an insignificant number of parity errors are detected, the WSQ may be determined by the minimum of the SNR and Sync Code Bit Error measures, for example. The WSQ may not be set lower than 3 if no parity errors are detected. Generally, the SNR may drive the upper range of WSQ, from 4 to 6, since very few bit errors may occur when the SNR is greater than its corresponding level of 3. Embodiments contemplate that the Sync Code Error rate may force the code lower than the SNR may otherwise set it, or vice-versa, but neither may override the Parity Bit Error measurement.

Figure 3A:
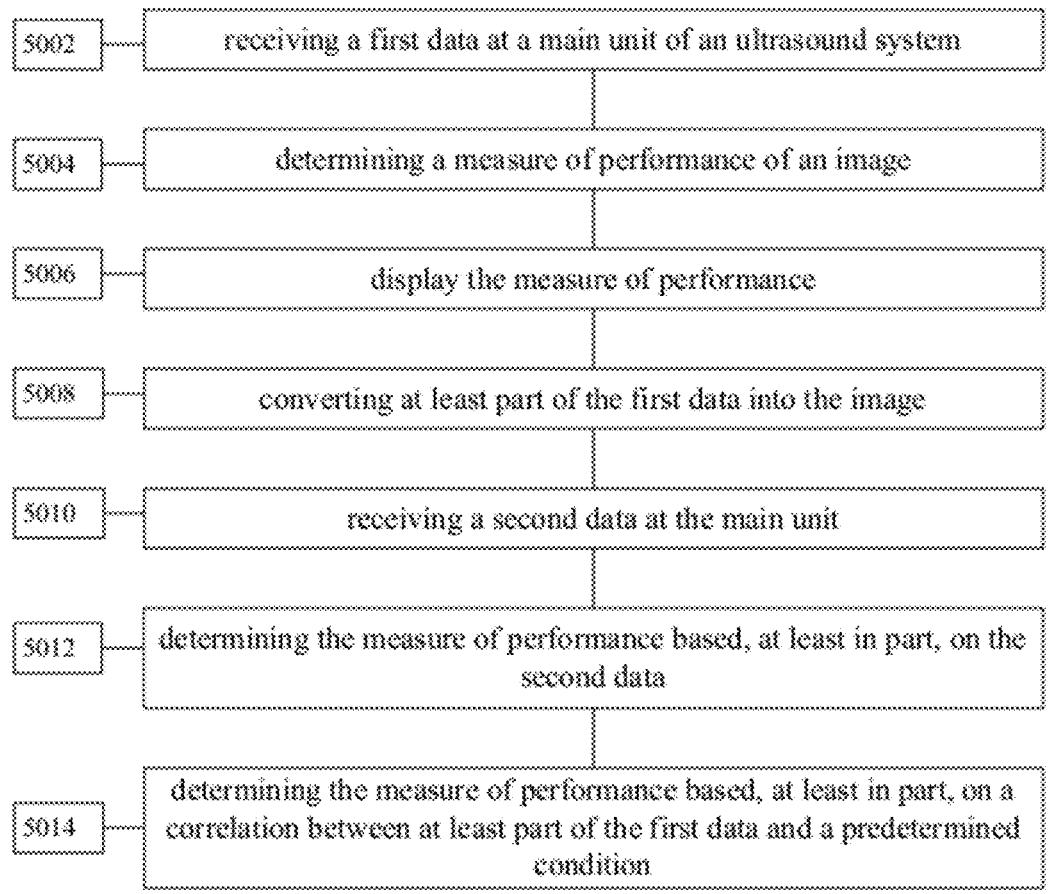
FIG. 3A illustrates a flowchart of an exemplary technique consistent with embodiments.

In view of the foregoing description, and referring to FIG. 3A, embodiments contemplate techniques of determining an image quality. At 5002, embodiments may include receiving a first data at a main unit of an ultrasound system. Embodiments may further include, at 5004, determining a measure of performance of an image. Embodiments contemplate that the image may be derivable or convertible from at least a part of the first data. At 5006, the measure of performance may be displayed. Embodiments contemplate that the first data may be received via at least one of a wireless communication link or a wired connection. Embodiments may further include, at 5008, converting at least part of the first data into the image.

Alternatively or additionally, embodiments may further include, at 5010, receiving a second data at the main unit. One or more embodiments may include, at 5012, determining the measure of performance based, at least in part, on the second data.

Alternatively or additionally, embodiments may further include, at 5014, determining the measure of performance based, at least in part, on a correlation between at least part of the first data and a predetermined condition.

Figure 3B:
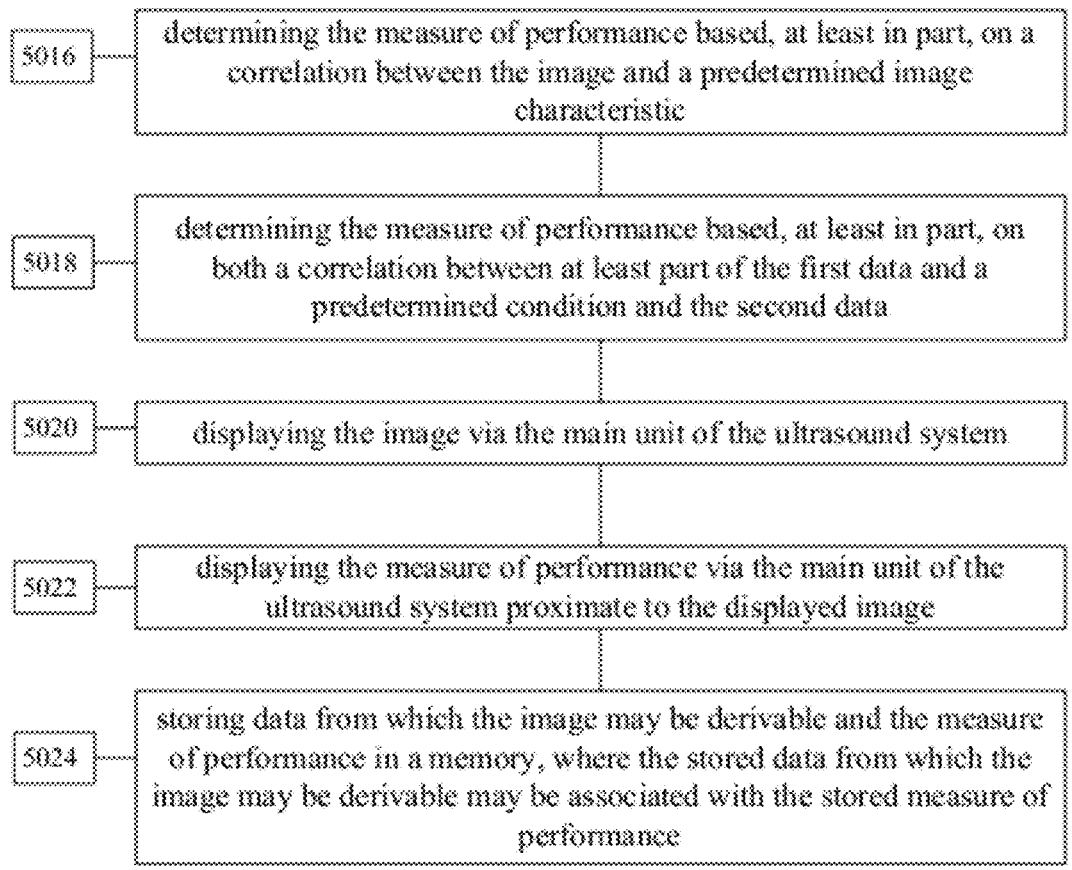
FIG. 3B illustrates a flowchart of an exemplary technique consistent with embodiments.

Referring to FIG. 3B, alternatively or additionally, embodiments may further include, at 5016, determining the measure of performance based, at least in part, on a correlation between the image and a predetermined image characteristic.

Alternatively or additionally, embodiments may further include, at 5018, determining the measure of performance based, at least in part, on both a correlation between at least part of the first data and a predetermined condition and the second data.

Embodiments contemplate, at 5020, displaying the image via the main unit of the ultrasound system. One or more embodiments may include, at 5022, displaying the measure of performance via the main unit of the ultrasound system proximate to the displayed image.

Alternatively or additionally, at 5024, embodiments may further include storing data from which the image may be derivable and the measure of performance in a memory, where the stored data from which the image may be derivable may be associated with the stored measure of performance.

One or more embodiments contemplate that the first data may include at least one of image pixel data, channel data, echo signal data, baseband data, beamformed data, or non-beamformed data, or the like. Embodiments also contemplate that the second data may include at least one of one or more predetermined data frames or data including one or more predetermined characteristics. Additionally, embodiments contemplate that the predetermined condition may include at least one of a predetermined imaging performance characteristic or a statistic representative of an expected imaging performance. Embodiments also contemplate that the predetermined image characteristic may include at least one of image noise, an amount of image noise, or a type of image noise. Also, embodiments contemplate that the predetermined image characteristics may be used to differentiate image speckle from other forms of image noise (e.g., white noise, shot noise, or impulsive noise), or characterize an amount of image speckle relative to an amount of other forms of image noise. Embodiments contemplate that speckle may be characterized as multiplicative noise, and one or more embodiments may differentiate multiplicative noise from additive noise, for example.

Figure 3C:
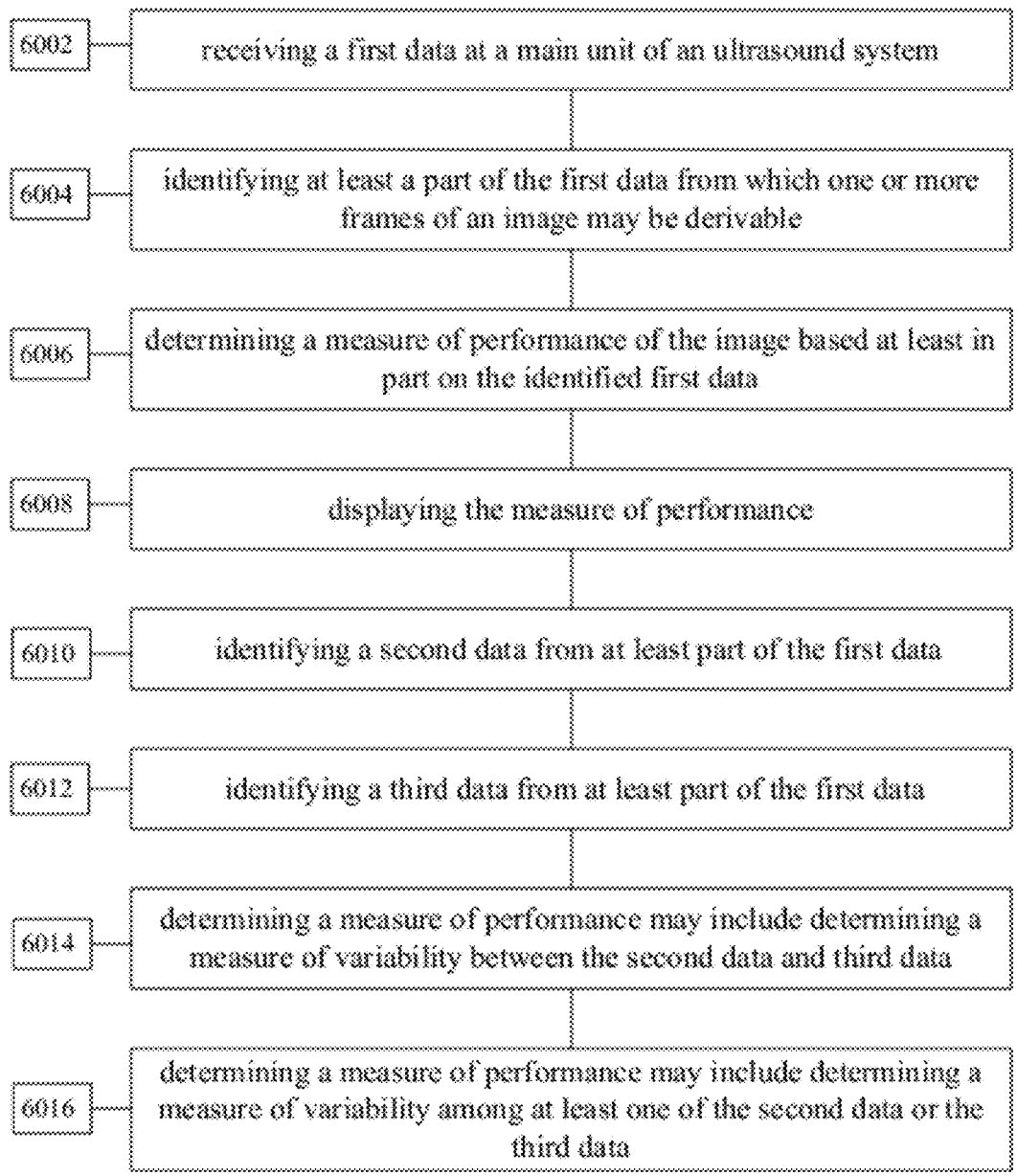
FIG. 3C illustrates a flowchart of an exemplary technique consistent with embodiments.

Referring to FIG. 3C, alternatively or additionally, embodiments may include, at 6002, receiving a first data at a main unit of an ultrasound system. Embodiments may also include, at 6004, identifying at least a part of the first data from which one or more frames of an image may be derivable. At 6006, embodiments may include determining a measure of performance of the image based, at least in part, on the identified first data. Also, at 6008, embodiments may include displaying the measure of performance Alternatively or additionally, embodiments contemplate, at 6010, identifying a second data from at least part of the first data, and, at 6012, identifying a third data from at least part of the first data. Embodiments contemplate that a first frame of the image may be derivable from the second data and that a second frame of the image may be derivable from the third data.

Alternatively or additionally, embodiments contemplate, at 6014, that the determining a measure of performance may include determining a measure of variability between the second data and third data. Alternatively or additionally, embodiments contemplate, at 6016, that the determining a measure of performance may include determining a measure of variability among at least one of the second data or the third data. Alternatively or additionally, embodiments contemplate storing data from which the image may be derivable and the measure of performance in a memory, where the stored data from which the image may be derivable may be associated with the stored measure of performance.

Figure 3D:
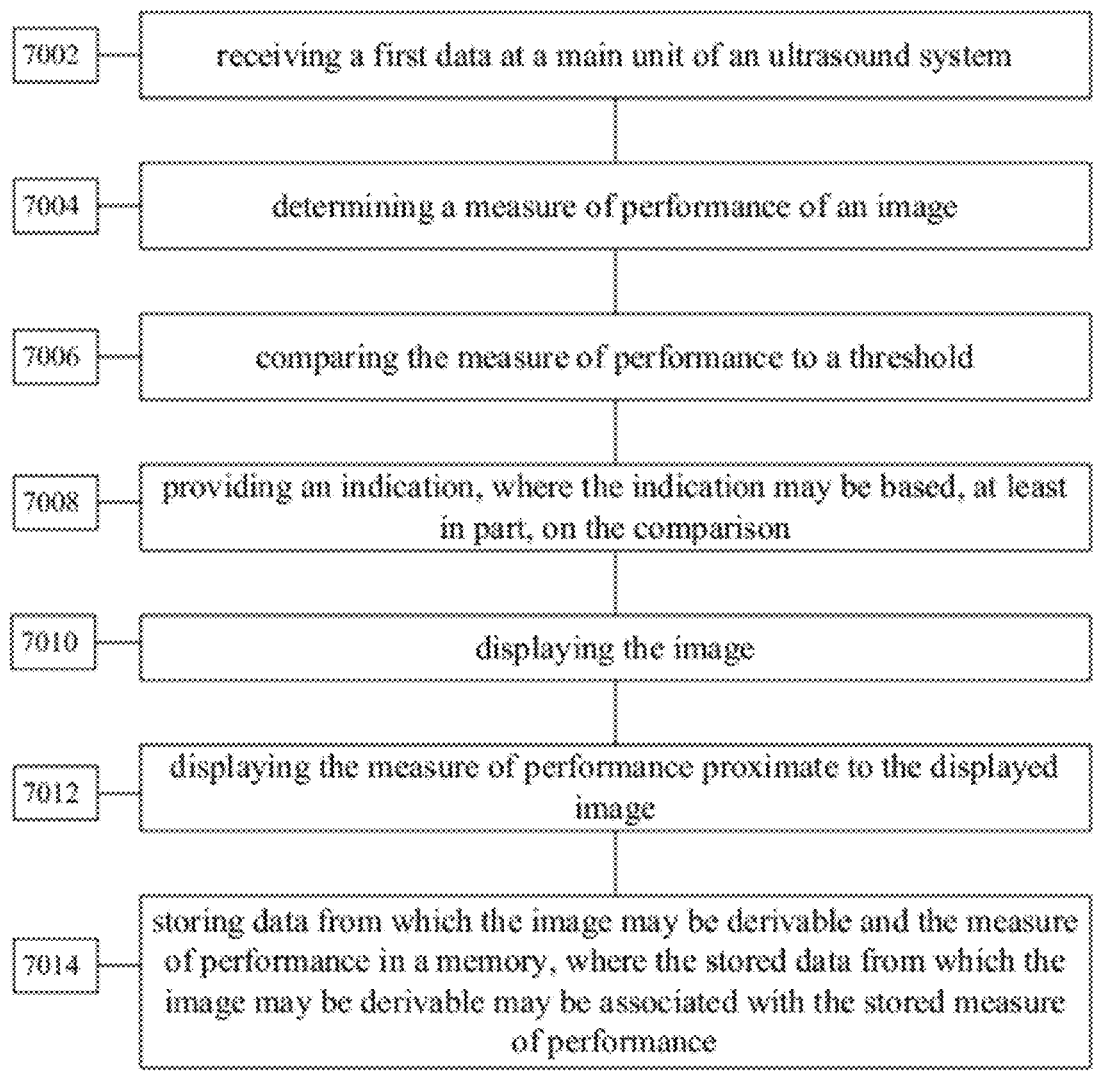
FIG. 3D illustrates a flowchart of an exemplary technique consistent with embodiments.

Referring to FIG. 3D, alternatively or additionally, embodiments contemplate techniques of determining image quality. Embodiments may include, at 7002, receiving a first data at a main unit of an ultrasound system. At 7004, embodiments may include determining a measure of performance of an image. Embodiments contemplate that the image may be derivable from at least a part of the first data. Embodiments may also include, at 7006, comparing the measure of performance to a threshold. At 7008, embodiments may include providing an indication, where the indication may be based, at least in part, on the comparison.

Embodiments contemplate that the indication may include at least one of a display of the measure of performance, a display of a difference between the threshold and the measure of performance, a blanking of at least part of a display device, a display of a predetermined message, a display of a predetermined pattern, a display of a predetermined color, at least a partial illumination of a light, an audible presentation of a predetermined message, or an audible presentation of a predetermined sound.

Alternatively or additionally, embodiments contemplate that the indication of the comparison may be provided upon the measure of performance being above the threshold. Also, alternatively or additionally, embodiments may further include, at 7010, displaying the image and, at 7012, displaying the measure of performance proximate to the displayed image. Alternatively or additionally, embodiments may include, at 7014, storing data from which the image may be derivable and the measure of performance in a memory, where the stored data from which the image may be derivable may be associated with the stored measure of performance.

While the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed is:

1. A method of determining image quality, comprising:
receiving a first data at a main unit of an ultrasound system, wherein the first data is digital data derived from ultrasound waves received at a remote unit, and the first data was sent in a transmission from the remote unit of the ultrasound system to the main unit of the ultrasound system;
determining a measure of performance of the transmission on at least one indicator based on correlation between at least first data and a predetermined condition;
converting at least part of the first data into an image; and displaying the measure of performance with the image via a display of the main unit of the ultrasound system, wherein the measure of performance is displayed proximate to the image and storing data from which the image is derivable and the measure of performance in a memory wherein the image is derivable being associated with the stored measure of performance.

2. The method of claim 1, wherein the first data is received via at least one of a wireless communication link or a wired connection.

3. The method of claim 1, further including:
receiving a second data at the main unit, wherein the determining the measure of performance is based, at least in part, on the second data.

4. The method of claim 1, wherein the determining the measure of performance is based, at least in part, on a correlation between at least part of the first data and a predetermined condition.

5. The method of claim 1, wherein the determining the measure of performance is based, at least in part, on a correlation between the image and a predetermined image characteristic.

6. The method of claim 4, further including receiving a second data at the main unit, wherein the determining the measure of performance is based, at least in part, on both the correlation and the second data.

7. The method of claim 1, wherein the first data includes at least one of image pixel data, channel data, echo signal data, baseband data, beam formed data, or non-beam formed data.

8. The method of claim 3, wherein the second data includes at least one of a predetermined data frame or data including one or more predetermined characteristics.

9. The method of claim 4, wherein the predetermined condition includes at least one of a predetermined imaging performance characteristic or a statistic representative of an expected imaging performance.

10. The method of claim 5, wherein the predetermined image characteristic includes at least one of image noise, an amount of image noise, or a type of image noise.

11. The method of claim 1, further including storing data from which the image is derivable and the measure of performance in a memory, the stored data from which the image is derivable being associated with the stored measure of performance.

12. A method of determining image quality, comprising:
receiving a first data at a main unit of an ultrasound system through a transmission from a remote unit of the ultrasound system, wherein the first data is digital data derived at the remote unit from acoustic echo waves received by the remote unit; and the first data was sent in a transmission from the remote unit of the ultrasound system to the main unit of the ultrasound system;
identifying at least a part of the first data from which one or more frames of an image are derivable;
determining a measure of performance of the transmission of the first data on at least one indicator based on correlation between at least first data and a predetermined condition; and
converting at least part of the first data into an image;
displaying the measure of performance proximate to an image derived from the identified part of the first data at the main unit; and storing data from which the image is derivable and the measure of performance in a memory wherein the image is derivable being associated with the stored measure of performance.

13. The method of claim 12, further including:
identifying a second data from at least part of the first data; and
identifying a third data from at least part of the first data, wherein a first frame of the image is derivable from the second data and a second frame of the image is derivable from the third data.

14. The method of claim 13, wherein the determining a measure of performance includes determining a measure of variability between the second data and third data.

15. The method of claim 13, wherein the determining a measure of performance includes determining a measure of variability among at least one of the second data or the third data.

16. The method of claim 12, wherein the first data is received via at least one of a wireless communication link or a wired connection.

17. The method of claim 12, further comprising storing data from which the image is derivable and the measure of performance in a memory, the stored data from which the image is derivable being associated with the stored measure of performance 18. A main unit of an ultrasound system, comprising: a receiver, the receiver configured, to receive a first data sent through a transmission from a remote unit of the ultrasound system, wherein the first data is generated responsive to ultrasound waves received at the remote unit;
a processor, the processor configured, to determine a measure of performance of the transmission based on at least one indicator based on correlation between at least first data and a predetermined condition;
an image being derivable from at least of the first data; and determining a measure of performance of the transmission of the first data on at least one indicator based on correlation between at least first data and a predetermined condition; and converting at least part of the first data into an image; and
a display, the display configured, to indicate the measure of performance proximate to the image from the identified part of the first data at the main unit; and a storage configured to store data from which the image is derivable and the measure of performance in a memory wherein the image is derivable being associated with the stored measure of performance.

19. The main unit of claim 18, wherein the receiver is further configured to receive the first data via at least one of a wireless communication link or a wired connection.

20. The main unit of claim 18, wherein the processor is further configured to determine the measure of performance based, at least in part, on a correlation between at least part of the first data and a predetermined condition.

21. The main unit of claim 18, wherein the receiver is further configured to receive a second data, and the processor is further configured to determine the measure of performance based, at least in part, on the second data.

22. The main unit of claim 18, wherein the processor is further configured to determine the measure of performance based, at least in part, on a correlation between an image converted from the first data and a predetermined image characteristic.

23. The main unit of claim 20, wherein the receiver is further configured to receive a second data, wherein the processor is further configured to determine the measure of performance based, at least in part, on both the correlation and the second data.

24. The main unit of claim 18, further comprising a memory, wherein data from which the image is derivable and the measure of performance is stored in the memory, the stored data from which the image is derivable being associated with the stored measure of performance.

* * * * *